United States Patent
Yamamoto et al.

(10) Patent No.: US 6,432,475 B1
(45) Date of Patent: Aug. 13, 2002

(54) PRESSURE-SENSITIVE ADHESIVE COMPOSITION, PROCESS FOR THE PREPARATION THEREOF AND PRESSURE-SENSITIVE ADHESIVE SHEETS

(75) Inventors: Michiharu Yamamoto; Yutaka Moroishi; Kenichi Okada; Fumiko Kamifuji; Tomoko Doi, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/456,912

(22) Filed: Dec. 7, 1999

(30) Foreign Application Priority Data

| Dec. 8, 1998 | (JP) | ............................................ | 10-348335 |
| Jun. 16, 1999 | (JP) | ............................................ | 11-170220 |
| Aug. 6, 1999 | (JP) | ............................................ | 11-223149 |
| Oct. 29, 1999 | (JP) | ............................................ | 11-308230 |

(51) Int. Cl.[7] .......................... B05D 5/10; B32B 27/30; B32B 27/32; B32B 27/38; C08L 53/00
(52) U.S. Cl. ..................... 427/208.4; 428/413; 428/500; 428/523; 525/94; 526/93; 526/320; 526/145; 526/146; 526/147
(58) Field of Search ................................. 428/413, 500, 428/523; 526/135, 145–147, 93, 320; 427/208.4; 525/94

(56) References Cited

U.S. PATENT DOCUMENTS

| 5,403,658 A | | 4/1995 | Southwick et al. | |
| 5,754,338 A | * | 5/1998 | Wilson et al. | ............... 359/530 |
| 5,763,548 A | | 6/1998 | Matyjaszewski et al. | |
| 5,807,937 A | * | 9/1998 | Matyjaszewski et al. | ... 526/135 |
| 6,274,688 B1 | * | 8/2001 | Nakagawa et al. | ...... 526/329.7 |
| 6,288,173 B1 | * | 9/2001 | Schimmel et al. | .......... 525/294 |

FOREIGN PATENT DOCUMENTS

| EP | 0 298 667 A2 | 1/1989 |
| EP | 0 921 170 A1 | 6/1999 |
| GB | 2 267 284 A | 12/1993 |

OTHER PUBLICATIONS

Polymer Science Dictionary; Mark Alger, Chapman & Hall; 1997: Cure and Crosslinking.*
European Search Report.

* cited by examiner

Primary Examiner—Robert Dawson
Assistant Examiner—Michael J Feely
(74) Attorney, Agent, or Firm—Sughrue Mion, PLLC

(57) ABSTRACT

A pressure-sensitive adhesive composition having well-balanced pressure-sensitive adhesive force and cohesive force without causing any safety or economy problems, a process for the preparation of the same and pressure-sensitive adhesive sheets using the same are disclosed. The pressure-sensitive adhesive composition comprises a crosslinked polymer obtained by crosslinking a block copolymer comprising at least two of a styrene-based polymer block A and an acrylic polymer block B having a structural unit represented by the general formula (1):— $[CH_2=C(R^1)COOR^2]$ — wherein $R^1$ represents a hydrogen atom or methyl group, and $R^2$ represents a $C_{2-14}$ alkyl group, bonded each other, such as A–B or B–A type block copolymer and A–B–A type block copolymer.

18 Claims, No Drawings

PRESSURE-SENSITIVE ADHESIVE COMPOSITION, PROCESS FOR THE PREPARATION THEREOF AND PRESSURE-SENSITIVE ADHESIVE SHEETS

FIELD OF THE INVENTION

The present invention relates to a pressure-sensitive adhesive composition comprising a crosslinked polymer obtained by crosslinking a block copolymer comprising at least two of a styrene-based polymer block A and an acrylic polymer block B block-bonded each other and a process for the preparation thereof. The present invention also relates to pressure-sensitive adhesive sheets of the pressure-sensitive adhesive composition in the form of sheet, tape or the like.

BACKGROUND OF THE INVENTION

In recent years, pressure-sensitive adhesives such as solvent type pressure-sensitive, emulsion type pressure-sensitive adhesive and hot-melt type pressure-sensitive adhesive have been used for materials which are required to be easily adhered by simply pressing, such as packaging pressure-sensitive adhesive tapes, masking pressure-sensitive adhesive tapes for coating, sanitary pressure-sensitive adhesive tape, paper diaper fixing tape and pressure-sensitive adhesive label.

As the solvent type pressure-sensitive adhesives there have been known acrylic and rubber-based pressure-sensitive adhesives. In recent years, it has been required that the amount of pressure-sensitive adhesives to be used be minimized from the standpoint of drying efficiency, energy saving and working atmosphere. If the amount of the solvent to be used in the polymerization is reduced to meet this demand, a safety problem occurs due to difficulty in controlling the resulting polymerization heat. Further, the emulsion type pressure-sensitive adhesives are disadvantageous in that since they comprise polymer particles dispersed in water, the water content needs to be finally removed during the formation of the pressure-sensitive adhesive layer, resulting in the deterioration of drying efficiency and energy saving.

The hot-melt type pressure-sensitive adhesives are superior to the solvent type or emulsion type pressure-sensitive adhesives with respect to safety or economy. For example, hot-melt type pressure-sensitive adhesives mainly comprising styrene-isoprene block copolymer have been known. In general, however, this type of pressure-sensitive adhesives exhibits a poor light resistance and thus are disadvantageous in that the resulting products exhibit deterioration in properties with the lapse of time. In an attempt to overcome these difficulties and hence obtain pressure-sensitive adhesives free from these difficulties, acrylic polymer components, which are normally known to exhibit a good light resistance, are introduced instead of the isoprene-based polymer components, which cause the deterioration of the light resistance of the resulting products.

A random copolymer of acrylic monomer with styrene-based monomer can be easily synthesized. There are examples of an pressure-sensitive adhesive mainly comprising such a random copolymer. However, no products exhibiting satisfactory pressure-sensitive adhesive properties have been obtained. On the other hand, block copolymers of styrene-based polymer component and acrylic polymer component cannot be easily obtained by any of radical polymerization method, anionic polymerization method and cationic polymerization method. There are no examples of a pressure-sensitive adhesive mainly comprising such a block copolymer.

SUMMARY OF THE INVENTION

Accordingly, one object of the present invention is to provide a pressure-sensitive adhesive composition which comprises as an pressure-sensitive adhesive a block copolymer of a styrene-based polymer component and an acrylic polymer component that has been easily produced free from safety problems in the absence of solvent or in the presence of a small amount of a solvent to satisfy the desired pressure-sensitive adhesive properties in addition to the inherent characteristics due to the introduction of acrylic polymer component, i.e., enhancing the light resistance, without causing economic problems as in the conventional emulsion type pressure-sensitive adhesives, i.e., problems in drying efficiency and energy saving due to removal of water content.

Another object of the present invention is to provide a process for the preparation the pressure sensitive adhesive composition.

Still another object of the present invention is to provide pressure-sensitive adhesive sheets comprising the pressure-sensitive adhesive composition.

As a result of extensive studies on the above-described problems, it has been found that a living radical polymerization of a styrene-based monomer with an acrylic monomer in the presence of a specific activating agent and a polymerization initiator makes it easy to produce an A-B type or B-A type block copolymer or three-block or higher copolymers of styrene-based polymer block A and acrylic polymer block B, no appropriate synthesis methods of which having been known, in the absence of a solvent or in the presence of a small amount of a solvent without causing any problems in controlling the resulting polymerization heat. It has also been found that the use of a crosslinked polymer obtained by crosslinking the copolymer as a main component of a pressure-sensitive adhesive makes it possible to obtain a pressure-sensitive adhesive composition which sufficiently satisfies the desired pressure-sensitive adhesive properties, particularly well-balanced pressure-sensitive adhesive force and cohesive force and excellent heat resistance, in addition to the effect of enhancing the light resistance characteristic to the acrylic polymer block B without causing any economic problems as: in the conventional emulsion type pressure-sensitive adhesives. The present invention has been completed based on those findings.

The present invention provides a pressure-sensitive adhesive composition comprising a crosslinked polymer obtained by crosslinking a block copolymer comprising at least two of a styrene-based polymer block A and an acrylic polymer block B having a structural unit represented by the general formula (1): —[$CH_2$—$C(R^1)COOR^2$]— wherein $R^1$ represents a hydrogen atom or methyl group, and $R^2$ represents a $C_{2-14}$ alkyl group), block-bonded each other.

The present invention also provides pressure-sensitive adhesive sheets comprising a layer of the pressure-sensitive adhesive composition having the above structure provided on a support.

The present invention further provides a process for the preparation of the pressure-sensitive adhesive composition, which comprises subjecting a styrene-based monomer and an acrylic monomer represented by the general formula (1A): $CH_2$=$C(R^1)COOR^2$ wherein $R^1$ represents a hydrogen atom or methyl group, and $R^2$ represents a $C_{2-14}$ alkyl group, optionally together with a monomer having an epoxy group in its molecule and/or a monomer having a hydroxyl group in its molecule, to a living radical polymerization in an appropriate order of monomers using a polymerization initiator in the presence of a transition metal and its ligand to produce a block copolymer comprising at least two of a styrene-based polymer block A and an acrylic polymer block B, block-bonded to each other, and then subjecting said block copolymer to crosslinking to produce a crosslinked polymer.

DETAILED DESCRIPTION OF THE INVENTION

Details of the living radical polymerization method are described in various literature references, e.g., (1) Patten et al., "Radical Polymerization Yielding Polymers with Mw/Mn ~1.05 by Homogeneous Atom Transfer Radical Polymerization", Polymer Preprinted, pp. 575–576, No. 37 (March 1996), (2) Matyjasewski et al., "Controlled/Living Radical Polymerization. Halogen Atom Transfer Radical Polymerization Promotedbya Cu(I)/Cu(II) Redox Process", Macromolecules 1995, 28, 7901–7910, Oct. 15, 1995, (3) PCT/US96/03302 to Matyjasewski et al., International Publication No. WO96/30421, Oct. 3, 1996, (4) M. Sawamoto et al., "Ruthenium-mediated Living Radical Polymerization of Methyl Methacrylate", Macromolecules, 1996, 29, 1070.

The present inventors paid their attention to the living radical polymerization method. As a result, it was found that the living radical polymerization of a styrene-based polymer and an acrylic monomer in an appropriate order using a polymerization initiator in the presence of a transition metal and its ligand as an activating agent makes it easy to produce a block copolymer comprising at least two of styrene-based polymer block A and acrylic polymer block B, i.e., A-B type or B-A type block copolymer or three-block or higher block copolymers such as A-B-A type block copolymer.

Examples of the transition metal include Cu, Ru, Fe, Rh, V and Ni. In general, the transition metal used is selected from the group consisting of halides (chloride, bromide, etc.) of these metals. The ligand is coordinated with a transition metal as a center to form a complex. The ligandpreferably used is a bipyridine derivative, mercaptan derivative, trifluorate derivative or the like. Of the combinations of transition metal and its ligand, $Cu^{+1}$-bipyridine complex is most preferable from the standpoint of polymerization stability or polymerization rate.

The polymerization initiator preferably used is an ester-based or styrene-based derivative containing a halogen in α-position. In particular, a 2-bromo(or chloro)propionic acid derivative or chloro (or bromo)-1-phenyl derivative is more preferably used. Specific examples of these derivatives include methyl 2-bromo (or chloro)propionate, ethyl 2-bromo (or chloro)propionate, methyl 2-bromo(or chloro)-2-methylpropionate, ethyl 2-bromo or chloro)-2-methylpropionate and chloro(or bromo)-1-phenylethyl.

Examples of the styrene-based monomer to be used as one of the polymerizable monomers herein include styrene, α-methylstyrene and 2,4-dimethylstyrene. The acrylic monomer to be used as the other one of the polymerizable monomers is an acrylic or methacrylic acid alkyl ester represented by the general formula (1A): $CH_2=CR^1COOR^2$ wherein $R^1$ represents a hydrogen atom or methyl group, and $R^2$ represents a $C_{2-14}$ alkyl group. In particular, (meth) acrylic acid alkyl ester having a $C_{4-12}$ alkyl group, such as n-butyl (meth)acrylate, 2-ethylhexyl (meth)acrylate, isooctyl (meth)acrylate and isononyl (meth)acrylate are preferably used.

As the acrylic monomer, a modifying monomer copolymerizable with the acrylic or methacrylic acid alkyl ester can be used in combination with the acrylic or methacrylic acid alkyl ester. In this case, the modifying monomer is used in an amount of 50% by weight or less, preferably 30% by weight or less, and more preferably 20% by weight or less, based on the total weight of the acrylic monomer in order to obtain good pressure-sensitive adhesive properties. Examples of the modifying monomer used include (meth) acrylamide, maleic acid monoester, maleic acid diester, glycidyl (meth)acrylate, N,N-dimethylaminoethyl (meth) acrylate, N,N-dimethylaminopropyl (meth)acrylate, N-vinylpyrrolidone, acrylonitrile and (meth) acryloylmorpholine.

In the living radical polymerization method, a styrene-based monomer is first polymerized. Subsequently, an acrylic monomer is added to continue the polymerization of monomers. Thus, an A-B type block copolymer can be produced. During this polymerization procedure, the acrylic monomer is added at the time when the amount of the styrene-based monomer added exceeds at least 50% by weight, normally 70% by weight or more, preferably 80% by weight or more, and more preferably 90% by weight or more. On the other hand, if the acrylic monomer is polymerized prior to the addition and polymerization of the styrene-based monomer, a B-A type block copolymer can be produced. Similar to the above polymerization procedure, the styrene-based monomer is added at the time when the amount of the acrylic monomer added exceeds at least 50% by weight, normally 70% byweight or more, preferably 80% by weight ormore, and more preferably 90% by weight or more.

Further, if the living radical polymerization is carried out in amanner such thata styrene-basedmonomer is polymerized, an acrylic monomer is added to continue polymerization of monomers, and the styrene-based monomer is then added to continue polymerization of monomers, an A-B-A type block copolymer can be produced. During the successive polymerization procedure, the monomer to be subsequently added is added at the time when the conversion of the monomer which has been previously added exceeds at least 50% by weight, normally 60% by weight or more, preferably 80% by weight or more, and more preferably 90% by weight or more.

Moreover, if the above three-stage polymerization is followed by the addition of the acrylic monomer to continue the polymerization of monomers, an A-B-A-B type block copolymer can be produced. If this polymerization procedure is then followed by the addition of the styrene-based monomer to continue the polymerization of monomers, an A-B-A-B-A type block copolymer can be produced. On the other hand, if an alternating living radical polymerization is effected in the same manner as described above except that the monomer to be first polymerized is changed to an acrylic monomer, a block copolymer such as B-A-B type, B-A-B-A type and B-A-B-A-B type block copolymers can be produced. In other words, the alternate living radical polymerization of a styrene-based monomer and an acrylic monomer makes it possible to produce various block copolymers comprising at least three of a styrene-based polymer block A and an acrylic polymer block B alternately bonded each other.

Two or more styrene-based polymer blocks A constituting the block copolymer comprising at least three blocks bonded each other may not be the same but may be styrene-based polymer blocks A1, A2 and A3 having different monomer compositions. Similarly, two or more acrylic polymer blocks B constituting the block copolymer may be acrylic polymer blocks B1, B2 and B3 having different monomer compositions.

In the present invention, it is generally preferred that a styrene-based monomer and an acrylic monomer be subjected to alternate living radical polymerization. However, when the styrene-based polymer blocks A (A1, A2, A3, etc.) or acrylic polymer blocks B (B1, B2, B3, etc.) have different monomer compositions which are definitely distinguished from each other in properties, the order of monomers to be subjected to living radical polymerization may be changed as necessary to produce three-block or higher block copolymers which do not necessarily comprise a styrene-based polymer block A and an acrylic polymer block B alternately bonded each other, such as A1-A2-B type, B1-B2-A type, A1-A2-B-A3 type, B1-B2-B3 type, A1-B-A2-A3 type, B1-A-B2-B3 type and A1-B1-A2-B2 type block copolymers.

In the living radical polymerization process, the polymerization initiator may be used in an amount of normally from 0.01 to 10 mol %, preferably from 0.1 to 5 mol %, and more preferably from 0.1 to 2 mol %, per mole of the sum of the polymerizable monomers containing a styrene-based monomer and an acrylic monomer (if a monomer containing a hydroxyl group or epoxy group in its molecular as described later is used, the sum of polymerizable monomers containing these monomers is used). The transition metal is used in the form of halide or the like in an amount of normally from 0.01 to 3 mols, and preferably from 0.1 to 1 mol, per mole of the polymerization initiator. The ligand of the transition metal is used in an amount of normally from 1 to 5 mols, and preferably from 2 to 3 mols, per mole of the transition metal which may be in the form of halide. The use of the polymerization initiator and the activating agent in the above defined proportion makes it possible to provide good results in the reactivity of living radical polymerization and the molecular weight of the resulting polymer.

The living radical polymerization can be proceeded without solvent or in the presence of a solvent such as butyl acetate, toluene and xylene. If the solvent is used, it is used in a small amount such that the solvent concentration after polymerization is 50% by weight or less in order to prevent the drop of polymerization rate. Even if the living radical polymerization is effected free from solvent or in the presence of a small amount of a solvent, little or no safety problems concerning the control over polymerization heat can occur. Rather, reduction in the amount of solvent used makes it possible to provide good results in economy, environmental protection, etc. Referring to the polymerization conditions, the living radical polymerization is carried out at a temperature of from 70° C. to 130° C. for about 1 to 100 hours, though depending the final molecular weight or polymerization temperature, taking into account the polymerization rate or deactivation of catalyst.

The block copolymer thus produced, if it is of A-B type, has a structure comprising a styrene-basedi polymer block A as a starting point having an acrylic polymer block B having a structural unit represented by the general formula (1): —[$CH_2$=C($R^1$)COO$R^2$]— wherein $R^1$ represents a hydrogen atom or methyl group, and $R^2$ represents a $C_{2-14}$ alkyl group, bonded thereto. If it is of B-A type, the block copolymer has a structure comprising the above acrylic polymer block B as a starting point having the styrene-based polymer block A bonded thereto. If it is of A-B-A type, the block copolymer has a structure comprising a styrene-based polymer block A as a starting point having the above acrylic polymer block B and styrene-based polymer block A sequentially bonded thereto. If it is of B-A-B type, the block copolymer has a structure comprising the above acrylic polymer block B as a starting point having a styrene-based polymer block A and an acrylic polymer block B sequentially bonded thereto. The block copolymer comprising at least two blocks connected to each other has a microdomain structure as in widely used styrene-isoprene-styrene block copolymers. It is presumed that this microdomain structure allows the block copolymer to exhibit well-balanced pressure-sensitive adhesive force and cohesive force when used as a pressure-sensitive adhesive.

The block copolymer comprising at least two blocks bonded each other comprises a styrene-based polymer block in a proportion not exceeding 50% by weight, preferably not exceeding 40% by weight, and more preferably 5 to 20% by weight, based on the total weight of the copolymer if it is of A-B or B-A type, or in a proportion of not exceeding 60% by weight, and preferably from 5 to 40% by weight, based on the total weight of the copolymer if it is three-block type such as A-B-A and B-A-B. If the proportion of the styrene-based polymer block A is too large, the resulting polymer lacks required viscoelasticity and thus is too hard for pressure-sensitive adhesives, which is not preferable. On the other hand, if the proportion of the styrene-based polymer block A is too small, the resulting polymer lacks cohesive force required for pressure-sensitive adhesives, which is also not preferable.

The present invention may optionally use, as the polymerizable monomer, a monomer containing an epoxy group or hydroxyl group in its molecule besides the styrene-based monomer and acrylic monomer. In this case, the structural unit derived from these monomers is contained in either the styrene-based polymer block A or the acrylic polymer block B depending on the time at which these monomers are added. Accordingly, the term "total weight of the block copolymer" as used herein means to indicate the sum of the weight of the styrene-based polymer block A and the acrylic polymer block B. However, the blocks A and B each have a structural unit derived from the above monomer containing a hydroxyl group or epoxy group in its molecule.

In the present invention, the block copolymer comprising at least two blocks bonded each other has a number average molecular weight of normally from 5,000 to 500,000, and preferably from 10,000 to 200,000, from the standpoint of pressure-sensitive adhesive properties and coatability. The term "number average molecular weight" as used herein means to indicate value determined by GPC (gel permeation chromatography) method in polystyrene equivalence.

The block copolymer preferably has a proper functional group in its polymer chain to facilitate its crosslinking at the final step. The kind of the functional group used is appropriately selected depending on the crosslinking method. For example, if the crosslinking treatment is effected with a polyfunctional isocyanate as a crosslinking agent under heating, the functional group reactive with the crosslinking agent is preferably a hydroxyl group. Further, in order to solve the problems concerning the control over the reaction time, i.e., pot life, by the use of the polyfunctional isocyanate, the functional group in the polymer chain, if the epoxy-crosslinking treatment is effected, is preferably an epoxy group or hydroxyl group.

The block copolymer having a hydroxyl group in its polymer chain suitable for crosslinking can be easily produced by using a material containing a hydroxyl group in its molecule as a polymerization initiator and/or using a monomer containing a hydroxyl group in its molecule as one of the polymerizable monomers.

The use of the polymerization initiator containing a hydroxyl group in its molecule makes it possible to introduce the hydroxyl group into the starting end of the polymer chain. Such a polymerization initiator used is an ester-based or styrene-based derivative containing a halogen in a-position and having a hydroxyl group in its molecule. Specific examples of the derivative used include 2-hydroxyethyl 2-bromo(or chloro)propionate, 4-hydroxybutyl 2-bromo(or chloro)propionate, 2-hydroxyethyl 2-bromo(or chloro)-2-methylpropionate, and 4-hydroxybutyl 2-bromo(or chloro)-2-methylpropionate. The polymerization initiator having a hydroxyl group in its molecule may be used in combination with the above polymerization initiator having no hydroxyl group in its molecule, with the proviso that the sum of the amount of the two polymerization initiators is as defined above.

If a monomer having a hydroxyl group in its molecule is used, the hydroxyl group can be introduced into the polymer chain at an arbitrary position depending on the time at which the monomer is added. Such a monomer used is an acrylic or methacrylic acid hydroxyalkylester represented by the general formula (2A): $CH_2=CR^3COOR^4$ wherein $R^3$ represents a hydrogen atom or methyl group, and $R^4$ represents a $C_{2-6}$ alkyl group having at least one hydroxyl group. Specific examples of the acrylic or methacrylic acid hydroxyalkylester include 2-hydroxyethyl (meth)acrylate, 3-hydroxypropyl (meth)acrylate, 4-hydroxybutyl (meth) acrylate and 6-hydroxyhexyl (meth) acrylate. Such a monomer is used in an amount of 10% by weight or less, and preferably 5% by weight or less, based on the total weight of the polymerizable monomers in order to maintain good pressure-sensitive adhesive properties.

The combined use of a polymerization initiator having a hydroxyl group in its molecule and a monomer having a hydroxyl group in its molecule makes it possible to provide better results in pressure-sensitive adhesive properties after crosslinking. In particular, if the monomer is added in the late stage of polymerization, i.e., at the time when the conversionof polymer reaches 80% by weight during the formation of the final stage polymer block (e.g., second stage for A-B or B-A type, third stage for A-B-A or B-A-B type), the hydroxyl group of the monomer can be introduced into the polymer chain at its terminal, in combination with the hydroxyl group derived from the polymerization initiator introduced into the polymer chain at its starting end. Thus, two or more hydroxyl groups are telechelically introduced into the block copolymer. As a result, the crosslinking reaction causes the polymer to extend linearly, making it possible to obtain a uniform crosslinked polymer having a small dispersion of interbridge distance that brings about good results in the enhancement of pressure-sensitive adhesive properties.

Examples of the block copolymer having an epoxy group or hydroxyl group in its polymer chain suitable for epoxy crosslinking include (a) block copolymer containing at least two epoxy groups per molecule, (b) block copolymer containing at least one epoxy group and at least one hydroxyl group per molecule and (c) block copolymer containing at least two hydroxyl groups per molecule.

The block copolymer (a) preferably:contains an epoxy group incorporated therein at or in the vicinity of the end of molecular chain. The block copolymercanbeeasilysynthesized by using a monomer having an epoxy group in its molecule as a monomer other than the styrene-based or acrylic monomer with a polymerization initiator having an epoxy group in its molecule.

If the monomer having an epoxy group in its molecule is used in the living radical polymerization, process, the epoxy group can be introduced into the polymer chain at an arbitrary position depending on the time at which the monomer is added. Accordingly, when the monomer is added in the late stage of polymerization, i.e., at the time when the conversion of styrene-basedmonomerandacrylicmonomer reaches 80% byweight, an epoxy group can be introduced into the polymer chain at or in the vicinity of the terminal thereof. If the polymerization reaction is effected in the presence of a polymerization initiator having two starting points per molecule, two epoxy groups are telechelically introduced into the molecular chain of copolymer. Alternatively, by adding the monomer separately, i.e., in the initial stage of polymerization and the late stage of polymerization, so that an epoxy group is introduced into the polymer chain at or in the vicinity of starting end of the polymer chain and at or in the vicinity of terminal of the polymer chain, the same telechelic structure as described above can be obtained. When such a block copolymer is epoxy-crosslinked to cure, the molecular chain of copolymer can extend linearly, making it possible to produce a uniform a crosslinked polymer having a small dispersion of interbridge distance that provides good results in the enhancement of pressure-sensitive adhesive properties.

The monomer having an epoxy group in its molecule is represented by the general formula (3A): $CH_2=C(R^5)COOR^6$ wherein $R^5$ represents a hydrogen atom or methyl group, and $R^6$ represents an alkyl group containing an epoxy group. Specific examples of the monomer include glycidyl (meth)acrylate, methylglycidyl (meth) acrylate, 3,4-epoxycyclohexylmethyl (meth) acrylate and 6-methyl-3,4-epoxycyclohexylmethyl (meth)acrylate. The amount of such a monomer to be used is normally 40% by weight or less, and preferably 4% by weight or less, based on the total weight of the polymerizable monomers in order to maintain good pressure-sensitive adhesive properties.

Further, the polymerization in the presence of the polymerization initiator having an epoxy group in its molecule makes it possible to introduce an epoxy group into the polymer chain at the starting end thereof. Accordingly, if an epoxy group is introduced into the polymer chain at the starting end thereof by using the polymerization initiator having an epoxy group in its molecule while introducing an epoxy group into the polymer chain at or in the vicinity of the terminal thereof by adding the monomer having an epoxy group in its molecule at the late stage of polymerization, two epoxy groups are telechelically introduced into the molecular chain of the copolymer. As a result, when the block copolymer thus obtained is then epoxy-crosslinked to cure, the molecular chain of the copolymer extends more linearly to produce a uniform crosslinked polymer having a small dispersion of interbridge distance that provides good results in the enhancement of pressure-sensitive adhesive properties.

The polymerization initiator having an epoxy group in its molecule used can be any ester-based or styrene-based derivative having a halogen in α-position and an epoxy group in its molecule so long as it does not inhibit the progress of living radical polymerization. Specific examples of such an ester-based or styrene-based derivative used include glycidyl 2-bromo(or chloro)propionate, glycidyl 2-bromo(or chloro)-2-methylpropionate, 3,4-epoxycyclohexylmethyl 2-bromo(or chloro)propionate and 3,4-epoxycyclohexylmethyl 2-bromo(or chloro)-2-methylpropionate.

The block copolymer (b) preferably comprises an epoxy group incorporated therein at or in the vicinity of one end of the molecular chain and a hydroxyl group incorporated therein at or in the vicinity of the other end of the molecular chain.

Such a block copolymer can be easily synthesized by (1) using as monomers other than the styrene-based monomer and acrylic monomer a monomer having an epoxy group in its molecule and a monomer having a hydroxyl group in its molecule in combination or (2) using a polymerization initiator having a hydroxyl group in its molecule together with the monomer having an epoxy group in its molecule or (3) using the monomer having a hydroxyl group in its molecule together with the polymerization initiator having an epoxy group in its molecule.

In accordance with the method (1), a monomer having an epoxy group in its molecule is added in the initial stage of polymerization, and a monomer having a hydroxyl group in its molecule is then added in the late stage of polymerization. Alternatively, the monomer having a hydroxyl group in its molecule is added in the initial stage of polymerization, and the monomer having an epoxy group in its molecule is then added in the late stage of polymerization. In this manner, an epoxy group (or hydroxyl group) can be introduced into the polymer chain at or in the vicinity of the starting end thereof while a hydroxyl group (or epoxy group) can be introduced into the polymer chain at or in the vicinity of the terminal thereof. Thus, an epoxy group and a hydroxyl group are telechelically introduced into the molecular chain of the copolymer. As a result, when the block copolymer thus obtained is then crosslinked between the epoxy groups or between the epoxy group and the hydroxyl group to cure, the molecular chain of the copolymer extends more linearly to produce a uniform crosslinked polymer having a small dispersion of interbridge distance that provides good results in pressure-sensitive adhesive properties.

In accordance with the method (2), a hydroxyl group is introduced into the polymer chain at the starting end thereof by using a polymerization initiator having a hydroxyl group in its molecule, and an epoxy group is then introduced into the polymer chain at or in the vicinity of the terminal thereof by adding a monomer having an epoxy group in its molecule in the late stage of polymerization. In this manner, an epoxy group and a hydroxyl group are telechelically introduced into the molecular chain of the copolymer. Similarly, in accordance with the method (3), an epoxy group is introduced into the polymer chain at the starting end thereof by using a polymerization initiator having an epoxy group in its molecule, and a hydroxyl group is then introduced into the polymer chain at or in the vicinity of the terminal thereof by adding a monomer having a hydroxyl group in its molecule in the late stage of polymerization. In this manner, an epoxy group and a hydroxyl group are similarly telechelically introduced into the molecular chain of the copolymer. Similarly, when the block copolymer thus obtained is then crosslinked between the epoxy groups or between the epoxy group and the hydroxyl group to cure, the molecular chain of the copolymer extends more linearly to produce a uniform crosslinked polymer having a small dispersion of interbridge distance that provides good results in pressure-sensitive adhesive properties.

The block copolymer (c) preferably comprises a hydroxyl group incorporated therein at or in the vicinity of the molecular chain. The block copolymer can be easily synthesized by using, as a monomer other than the styrene-based monomer and acrylic monomer, a monomer having a hydrbxyl group in its molecule, or using such a monomer together with a polymerization initiator having a hydroxyl group in its molecule.

A monomer having a hydroxyl group in its molecule is added in the late stage of polymerization so that a hydroxyl group is introduced into the polymer chain at or in the vicinity of the terminal thereof, during which a polymerization initiator having two starting points per molecule is used. Alternatively, the monomer is added separately in the initial stage of polymerization and in the late stage of polymerization so that a hydroxyl group is introduced into the polymer chain at or in the vicinity of the starting end thereof and at or in the vicinity of the terminal end thereof. Alternatively, the monomer having a hydroxyl group in its molecule is added in the late stage of polymerization so that a hydroxyl group is introduced into the polymer chain at or in the vicinity of the terminal thereof, during which a polymerization initiator having a hydroxyl group in its molecule is used so that a hydroxyl group is introduced into the polymer chain at the starting end thereof. In this manner, a block copolymer comprising two hydroxyl groups telechelically incorporated in its molecular chain can be synthesized. When the block is then crosslinked with an epoxy-crosslinking agent so that the epoxy group in the crosslinking agent and the hydroxyl group in the copolymer are crosslinked with each other, the molecular chain of the copolymer extends more linearly to produce a uniform crosslinked polymer having a small dispersion of interbridge distance that provides good results in pressure-sensitive adhesive properties.

In the present invention, the block copolymer is crosslinked to cause the extension of the main chain and the network formation at the same time, thereby producing a crosslinked polymer having a long molecular chain. The use of the crosslinked polymer as a main component of pressure-sensitive adhesive makes it possible to obtain an pressure-sensitive adhesive composition which remarkably satisfies the desired pressure-sensitive adhesive properties, particularly well-balanced pressure-sensitive adhesive peeling force and cohesive force and excellent heat resistance. The crosslinking method is not specifically limited. Various conventional crosslinking methods can be employed. One of the effective methods, if the block copolymer contains a hydroxyl group incorporated in the polymer chain, comprises heating the block copolymer with a polyfunctional isocyanate incorporated therein as a crosslinking agent so that the hydroxyl group in the block copolymer reacts with the isocyanate group as previously described.

Examples of the polyfunctional isocyanate used include tolylene diisocyanate, diphenylmethane diisocyanate, p-phenylene diisocyanate, hexamethylene diisocyanate, 1,5-napthalene diisocyanate, adducts of these diisocyanates with polyvalent alcohols such as propanetriol, and tricyanurate derivatives obtained by trimerizing these diisocyanates. These polyfunctional isocyanates may be heated during crosslinking in the form of block, particularly in the form of compound protected by ethyl acetoacetate, methyl ethyl ketoxime, caprolactam or the like, so that it is activated before use.

The amount of the polyfunctional isocyanate to be used depends on the number of hydroxyl groups contained in the block copolymer. In practice, however, the polyfunctional isocyanate is preferably used in an amount of from 0.05 to 5 parts by weight per 100 parts by weight of the block copolymer. If the amount of the polyfunctional isocyanate exceeds the above defined range, the resulting pressure-sensitive adhesive force is reduced. On the other hand, if the amount of the polyfunctional isocyanate falls below the above defined range, the resulting cohesive force is insufficient. The crosslinking treatment may be effected by heating to a temperature of from 50 to 150° C. The crosslinking treatment may be effected in the presence of a catalyst such as tin compound to increase the crosslinking rate.

Another crosslinking method, if the block copolymer contains an epoxy group in the polymer chain, particularly one belonging to the block copolymers (a) to (c), comprises subjecting the block copolymer to irradiation with ultraviolet rays in the presence of an onium salt-based curing catalyst and optionally an epoxy-based crosslinking agent so that it is epoxy-crosslinked. This method is advantageous in that it requires reduced energy, can be effected at a high efficiency and requires no heat-resistant support (i.e., object to which this method is applied is not limited) as compared with the heating method using a polyfunctional isocyanate.

The epoxy-based crosslinking agent used is a compound having two or more epoxy groups per molecule. Examples of such a compound include ethylene glycol diglycidyl ether (hereinafter referred to as "EGD"), glycerin diglycidyl ether, vinyl cyclohexene dioxide represented by the general formula (El) shown later, limonene dioxide represented by the general formula (E2) shown later, 3,4-epoxycyclohexylmethyl-3', 4'-epoxycyclohexyl carboxylate (hereinafter referred to as "BEP') represented by the general formula (E3) shown later, bis-(3,4-epoxycyclohexyl)adipate represented by the general formula (E4) shown later, trifunctional epoxy compound (hereinafter referred to as "3EP") represented by the general formula (E5) shown later, and tetrafunctional epoxy compound (hereinafter referred to as "4EP") represented by the general formula (E6) shown later.

These epoxy-based crosslinking agents are not essential components for epoxy crosslinking and thus may be or may not be used if the block copolymer is one belonging to the block copolymers (a) and (b) because the block copolymer has an epoxy group in its polymer chain. On the other hand, the block copolymer (c) has no epoxy group in its polymer chain and thus cannot be epoxy-crosslinked without such an epoxy-based crosslinking agent. The amount of such an epoxy-based crosslinking agent, if used, is normally 50 parts by weight or less, and preferably 30 parts by weight or less, per 100 parts by weight of the block copolymer in order to obtain good pressure-sensitive adhesive properties.

General formula (E1): Vinylcyclohexene dioxide

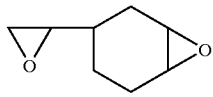

General formula (E2): Limonene dioxide

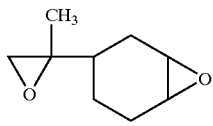

General formula (E3): BEP

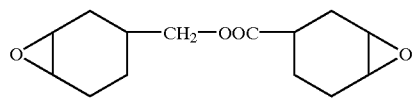

General formula (E4): Bis-(3,4-epoxycyclohexyl) adipate

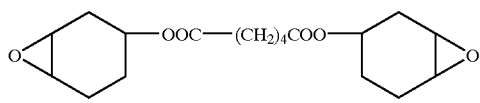

General formula (E5): 3ep

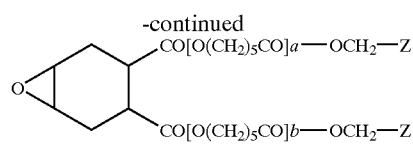

wherein a+b=1, and Z is 3,4-epoxycyclohexyl group represented by the following general formula:

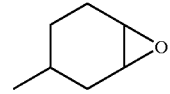

General formula (E6): 4EP

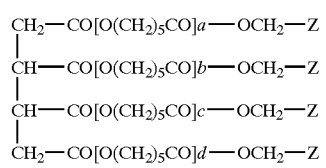

wherein a+b+c+d=3, and Z is 3,4-epoxycyclohexyl group represented by the following general formula:

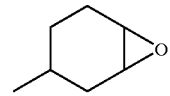

The onium salt-based curing catalyst used is preferably a diazonium salt, sulfonium salt or iodonium salt represented by $ArN_2^+Q^-$, $Y_3S^+Q^-$ or $Y_2I^+Q^-$, respectively, wherein Ar represents an aryl group such as bis (dodecylphenyl), Y represents an alkyl group or an aryl group defined above, and $Q^-$ represents a nonbasic nucleophilic anion such as $BF_4^-$, $PF_6^-$, $AsF_6^-$, $SbF_6^-$, $SbCl_6^-$, $HSO_4^-$ and Cl.

Specific examples of the onium salt-based curing catalyst used include bis(dodecylphenyl) iodoniumhexafluoroantimonate, bis(t-butylphenyl) iodonium hexafluorophosphate, bis(t-butylphenyl)iodonium trifluoromethanesulfonate, triphenylsulfonium trifluoromethanesulfonate, biphenyliodonium trifluoromethanesulfonate, phenyl-(3-hydroxy-pentadecylphenyl)iodonium hexafluoroantimonate, diaryliodoniumtetrakis(pentafluorophenyl)borate, and compounds containing these components. Besides these compounds, various mixtures containing the above components, e.g., UV-9380C, produced by Toshiba Silicone Co., Ltd., a product containing 45% by weight of bis (dodecylphenyl) iodonium hexafluoroantimonate, can be used. The amount of such an onium salt-based curing catalyst to be used is normally from 0.01 to 20 parts by weight, and preferably from 0.1 to 5 parts by weight, per 100 parts by weight of the block copolymer. If the amount of the onium salt-based curing catalyst is too small, the curability by crosslinking reaction is poor. On the other hand, if the amount of the onium salt-based curing catalyst is too large, the pressure-sensitive adhesive properties deteriorate.

The process involving the irradiation with ultraviolet rays in the presence of such an onium salt-based curing catalyst can be carried out by using an appropriate ultraviolet light source such as high-pressure mercury lamp, low-pressure mercury lamp and metal halide lamp. The exposed dose is not specifically limited. In practice, however, it is normally from 50 mJ to 5 J/cm². During this procedure, a filter or polyester sheet which cuts ultraviolet rays at the short wave side may be used. The irradiation temperature is not specifically limited. In practice, however, it can normally range from room temperature to 120° C.

The pressure-sensitive adhesive composition of the present invention may comprise a crosslinked polymer obtained by crosslinking as described above and the block copolymer comprising at least two of styrene-based polymer block A and acrylic polymer block B bonded each other as a main component and optionally various additives which are incorporated in conventional pressure-sensitive adhesive compositions, such as tackifying resins, fillers, antioxidants and pigments.

The pressure-sensitive adhesive sheets of the present invention are obtained by a process which comprises applying an uncrosslinked pressure-sensitive adhesive composition of the present invention to one or both surfaces of a support, optionally drying the coated material, and then subjecting the coated material to crosslinking in the same manner as described above to form a layer of the pressure-sensitive adhesive composition normally having a thickness of from 10 to 100 μm on each side, thereby producing a tape or sheet form. The support used is papers, plastic-laminated papers, cloth, plastic-laminated cloth, plastic film, metal foil, foamed products or the like. Applying the pressure-sensitive adhesive composition to the support can be accomplished by means of a hot melt coater, comma roll, gravure coater, roll coater, kiss coater, slot die coater, squeeze coater or the like.

The present invention will be further described in more detail by reference to the following examples, but it should be understood that the invention is not construed as being limited thereto.

Pressure-sensitive adhesive compositions comprising a crosslinked polymer obtained by crosslinking an A-B or B-A type block copolymer with a polyfunctional isocyanate according to Examples 1 to 30 will be described hereinafter as compared with pressure-sensitive adhesive compositions according to Comparative Examples 1 and 2.

The A-B type block copolymers (1) to (15) and B-A type block copolymer (16) used in the Examples and the random copolymer (1) used in the Comparative Examples were prepared by the following Preparation Examples 1 to 16 and Comparative Preparation Example 1, respectively. In those Preparation Examples, starting materials used are mostly commercially available products. However, 2-hydroxyethyl 2-bromopropionate (hereinafter simply referred to as "2-H2PN"), 4-hydroxybutyl 2-bromopropionate (hereinafter simply referred to as "2-H4PN"), 2-hydroxyethyl 2-bromo-2-methylpropionate (hereinafter simply referred to as "2-H2MPN") and 4-hydroxybutyl 2-bromo-2-methylpropionate (hereinafter simply referred to as "2-H4MPN"), which were used as polymerization initiators having a hydroxyl group in its molecule, were synthesized by the following methods.

Synthesis of 2-H2PN 4.1 g (20 mmol) of dicyclohexyl carbodiimide, 5 g (81 mmol) of anhydrous ethylene glycol and 1 ml (12 mmol) of pyridine were charged into a reaction vessel. To the mixture were then added 14 ml of acetone and 1.5 ml (16.7 mmol) of 2-bromopropionic acid while being cooled over ice bath to suppress an exothermic reaction. After completion of the reaction overnight, the resulting precipitate was removed by filtration. To the filtrate 20 ml of ethyl acetate and 15 ml of saturated brine were added. The mixture was then allowed to stand for a while. The resulting upper ethyl acetate layer was washed twice with diluted hydrochloric acid and then three times with 15 ml of saturated brine, and then dried with anhydrous magnesium sulfate. Magnesium sulfate was removed, and ethyl acetate was then distilled off under reduced pressure to obtain a crude product. The crude product thus obtained was purified through silica gel chromatography (developing solvent: 1/1 mixture of ethyl acetate and hexane) to obtain 2-H2PN as the desired product. The yield of 2-H2PN was 1.4 g (43% by weight).

Synthesis of 2-H4PN, 2-H2MPN and 2-H4MPN

2-H4PN was synthesized in the same manner as in 2-H2PN except that 1,4-butanediol was used instead of anhydrous ethylene glycol. 2-H2MPN was synthesized in the same manner as in 2-H2PN except that 2-bromo-2-methylpropionic acid was used instead of 2-bromopropionic acid. Further, 2-H4MPN was synthesized in the same manner as in 2-H2PN except that 1,4-butanediol was used instead of anhydrous ethylene glycol and 2-bromo-2-methylpropionic acid was used instead of 2-bromopropionic acid.

PREPARATION EXAMPLE 1

Into a four-necked flask equipped with a mechanical stirrer, a nitrogen inlet, a condenser and a rubber septum was charged 45.5 g (438 mmol) of styrene. To the content of the flask was then added 2.05 g (13.1 mmol) of 2,2'-bipyridine. The air in the reaction system was replaced by nitrogen. In a stream of nitrogen, the reaction mixture was heated to a temperature of 90° C. with 626 mg (4.36 mmol) of copper bromide (I) added thereto in the presence of 923 mg (4.37 mmol) of 2-H2MPN as a polymerization initiator to initiate polymerization. The polymerization was effected free from solvent at a temperature of 90° C. for 12 hours. When the conversion (hereinafter the value obtained by dividing the weight of the. polymer from which volatile components have been removed by heating by the initial weight of the polymer solution) was confirmed to have reached 80% by weight or more, 182 g (1,420 mmol) of n-butyl acrylate was added to the polymer solution through the rubber septum. The polymer solution was further heated for 20 hours.

When the conversion was again confirmed to have reached 80% by weight, 1.13 g (6.56 mmol) of 6-hydroxyhexyl acrylate was added to the polymerization system. The polymerization solution was polymerized overnight. The polymerized product thus obtained was diluted with ethyl acetate to a concentration of about 20% by weight. The catalyst was removed by filtration. Finally, ethyl acetate was distilled off. The residue was heated to a temperature of 60° C. under reduced pressure to prepare an A-B type block copolymer (1) in the form of oily polymer.

PREPARATION EXAMPLES 2 TO 14

A-B type block copolymers (2) to (14) in the form of oily polymer were prepared in the same manner as in Preparation Example 1 except that the charged amount of styrene, the kind and amount of the polymerization initiator and the kind and amount of the hydroxyl group-containing monomer were changed as shown in Table 1. During each of the polymerization processes, the molar amount of copper bromide (I) to be used was the same as that of the polymerization initiator, and the molar amount of 2,2'-bipyridine was three times that of the polymerization initiator.

In Table 1, the abbreviation "BA" indicates n-butyl acrylate, the abbreviation "2-BEMPN" indicates ethyl 2-bromo-2-methylpropionate, the abbreviation "2-CEMPN" indicates ethyl 2-chloro-2-methylpropionate, the abbreviation "2-HEA" indicates 2-hydroxyethyl acrylate and the abbreviation "6-HHA" indicates a6-hydroxyhexyl acrylate. In Table 1, the figure in the parenthesis indicates the molar amount (mmol) of the respective starting material component. Table 1 also contains the starting materials used in Preparation Example 1 for reference.

TABLE 1

| | Styrene (mmol) | BA (mmol) | Polymerization initiator (mmol) | Hydroxyl group-containing monomer (mmol |
|---|---|---|---|---|
| Preparation Example 1 | 45.5 g (438) | 182 g (1420) | 2-H2MPN (4.37) | 6-HHA (6.56) |
| Preparation Example 2 | 22.8 g (219) | 182 g (1420) | 2-H2MPN (4.37) | 6-HHA (6.56) |
| Preparation Example 3 | 34.2 g (329) | 182 g (1420) | 2-H2MPN (4.37) | 6-HHA (6.56) |
| Preparation Example 4 | 45.5 g (438) | 182 g (1420) | 2-H2MPN (10.9) | 6-HHA (16.4) |
| Preparation Example 5 | 45.5 g (438) | 182 g (1420) | 2-H2MPN (3.12) | 6-HHA (4.68) |
| Preparation Example 6 | 45.5 g (438) | 182 g (1420) | 2-H2MPN (4.37) | 6-HHA (8.74) |
| Preparation Example 7 | 45.5 g (438) | 182 g (1420) | 2-H2MPN (4.37) | 6-HHA (4.37) |
| Preparation Example 8 | 45.5 g (438) | 182 g (1420) | 2-H2MPN (4.37) | 2-HEA (6.56) |
| Preparation Example 9 | 45.5 g (438) | 182 g (1420) | 2-H4MPN (4.37) | 6-HHA (6.56) |
| Preparation Example 10 | 45.5 g (438) | 182 g (1420) | 2-H2PN (4.37) | 6-HHA (6.56) |
| Preparation Example 11 | 45.5 g (438) | 182 g (1420) | 2-H4PN (4.37) | 6-HHA (6.56) |
| Preparation Example 12 | 45.5 g (438) | 182 g (1420) | 2-BEMPN (4.37) | 6-HHA (6.56) |
| Preparation Example 13 | 45.5 g (438) | 182 g (1420) | 2-CEMPN (4.37) | 6-HHA (6.56) |
| Preparation Example 14 | 45.5 g (438) | 182 g (1420) | 2-H2MPN (4.37) | None |

The A-B type block copolymers (1) to (14) prepared in Preparation Examples 1 to 14 were measured for number average molecular weight [Mn], weightaverage molecular-weight [Mw] and polymer dispersibility [Mw/Mn]. The results obtained are shown in Table 2 below. For the measurement of molecular weight, GPC method described herein was used.

TABLE 2

| Sample No. of block copolymer | Mn (×1,000) | Mw (×1,000) | Mw/Mn |
|---|---|---|---|
| Preparation Example 1 | Block copolymer (1) | 51.8 | 89.6 | 1.73 |
| Preparation Example 2 | Block copolymer (2) | 46.7 | 88.3 | 1.89 |
| Preparation Example 3 | Block copolymer (3) | 47.3 | 83.7 | 1.77 |
| Preparation Example 4 | Block copolymer (4) | 21.1 | 43.5 | 2.06 |
| Preparation Example 5 | Block copolymer (5) | 72.0 | 147.6 | 2.05 |
| Preparation Example 6 | Block copolymer (6) | 53.2 | 88.8 | 1.67 |
| Preparation Example 7 | Block copolymer (7) | 50.8 | 79.2 | 1.56 |
| Preparation Example 8 | Block copolymer (8) | 52.2 | 97.6 | 1.87 |
| Preparation Example 9 | Block copolymer (9) | 54.3 | 103.2 | 1.90 |
| Preparation Example 10 | Block copolymer (10) | 50.5 | 92.4 | 1.83 |
| Preparation Example 11 | Block copolymer (11) | 51.7 | 91.0 | 1.76 |
| Preparation Example 12 | Block copolymer (12) | 52.1 | 81.3 | 1.56 |
| Preparation Example 13 | Block copolymer (13) | 52.2 | 91.9 | 1.76 |
| Preparation Example 14 | Block copolymer (14) | 49.9 | 91.3 | 1.83 |

PREPARATION EXAMPLE 15

Into a four-necked flask equipped with a mechanical stirrer, a nitrogen inlet, a condenser and a rubber septum was charged 45.5 g (438 mmol) of styrene. To the content of the flask was added 2.05 g (13.1 mmol) of 2,2'-bipyridine. The air in the reaction system was replaced by nitrogen. In a stream of nitrogen, the reaction mixture was heated to a temperature of 90° C. with 626 mg (4.36 mmol) of copper bromide (I) added thereto in the presence of 923 mg (4.37 mmol) of 2-H2MPN as a polymerization initiator to initiate polymerization. The polymerization was effected free from solvent at a temperature of 90° C. for 13 hours.

When the conversion was confirmed to have reached 80% by weight or more, a mixture of 182 g (1,420 mmol) of n-butyl acrylate and 1.13 g (6.56 mmol) of 6-hydroxyhexyl acrylate was added to the polymer solution through the rubber septum. The polymer solution was further heated for 25 hours. The polymerized product thus obtained was diluted with ethyl acetate to a concentration of about 20% by weight. The catalyst was removed by filtration. Finally, ethyl acetate was evaporated at a temperature of 60° C. under reduced pressure to prepare an A-B type block copolymer (15) in the form of oily polymer. The block copolymer thus obtained had a number average molecular weight [Mn] of 52.1×1,000, a weight average molecular weight [Mw] of 93.1×1,000 and a polymer dispersibility [Mw/Mn] of 1.78.

PREPARATION EXAMPLE 16

Into a four-necked flask equipped with a mechanical stirrer, a nitrogen inlet, a condenser and a rubber septum was charged 182.2 g (1,420 mmol) of n-butyl acrylate. To the content of the flask was added 2.05 g (13.1 mmol) of 2,2'-bipyridine. The air in the reaction system was replaced by nitrogen. In a stream of nitrogen, the reaction mixture was heated toatemperatureof 110° C. with 626 mg (4.36mmol) of copper bromide (I) added thereto. To the reaction mixture was added 923 mg (4.37 mmol) of 2-H4MPN as a polymerization initiator to initiate polymerization. The polymerization was effected free from solvent at a temperature of 90° C. for 13 hours. When the conversion was confirmed to have reached 80% by weight or more, 45.5 g (438 mmol) of styrene was added to the polymer solution through the rubber septum. The polymer solution was further heated for 20 hours.

When the conversion was confirmed to have reached 90% by weight or more, 1.13 g (6.56 mmol) of 6-hydroxyhexyl acrylate was added to the polymer solution. The polymer solution was polymerized overnight. The polymerized product thus obtained was then diluted with ethyl acetate to a concentration of about 20% by weight. The catalyst was removed by filtration. Finally, ethyl acetate was evaporated at a temperature of 60° C. under reduced pressure to prepare an B-A type block copolymer (16) in the form of oily polymer. The block copolymer thus obtained had a number average molecular weight [Mn] of 50.8×1,000, a weight average molecular weight [Mw] of 101.1×1,000 and a polymer dispersibility [Mw/Mn] of 1.99.

COMPARATIVE PREPARATION EXAMPLE 1

Into a four-necked flask equipped with a mechanical stirrer, a nitrogen inlet, a condenser and a rubber septum was chargedamixtureof 45.5 g (438mmol) of styrene, 182.2 g (1,420 mmol) of n-butyl acrylate, 0.3 g (3.84 mmol) of 2-mercaptoethanol, 1.13 g (6.56 mmol) of 6-hydroxyhexyl acrylate and 400 ml of ethyl acetate. To the content of the flask was added 0.5 g of azoisobutyronitrile. The reaction mixture was heated toa temperature of 60° C. and polymerized. Finally, ethyl acetate was evaporated at a temperature of 60° C. under reduced pressure to prepare a random copolymer (1) in the form of oily polymer. The random copolymer thus obtained had a number average molecular weight [Mn] of 60.8×1,000, a weight average molecular weight [Mw] of 122.3×1,000 and a polymer dispersibility [Mw/Mn] of 2.01.

EXAMPLE 1

4 g of the A-B type block copolymer (1) was diluted with 2 ml of ethyl acetate. To the solution were added 300 mg of a 1 wt-% toluene solution of dibutyltin laurate and 300 mg of a 10 wt-% toluene solution of diphenylmethane diisocyanate as a crosslinking agent to obtain an uncrosslinked pressure-sensitive adhesive composition. Subsequently, the pressure-sensitive adhesive composition thus obtained was applied to a polyethylene terephthalate film having a thickness of 27 μm by means of an applicator having a gap of 200 μm, and then dried at a temperature of 120° C. for 5 minutes and then at a temperature of 50° C. overnight to form an pressure-sensitive adhesive composition layer comprising a crosslinked polymer obtained by crosslinking the block copolymer (1). Thus, an pressure-sensitive adhesive sheet was obtained.

EXAMPLES 2 TO 30

Various pressure-sensitive adhesive composition layers comprising a crosslinked polymer of block copolymer were formed in the same manner as in Example 1 except that the kind of the block copolymers and polyfunctional isocyanates used were changed, respectively, as shown in Tables 3 to 5 below (the amount of the two components used were not changed). Thus, pressure-sensitive adhesive sheets were obtained.

COMPARATIVE EXAMPLES 1 AND 2

Pressure-sensitive adhesive sheets were prepared in the same manner as in Example 1 except that the random copolymer (1) was used instead of the block copolymer (1) and compounds as shown in Table 5 were used as the polyfunctional isocyanate (the amount of the two components used were not changed).

TABLE 3

| | Block copolymer | Polyfunctional isocyanate |
|---|---|---|
| Example 1 | Block copolymer (1) | Diphenylmethane diisocyanate |
| Example 2 | " | Tolylene diisocyanate |
| Example 3 | " | Hexamethylene diisocyanate |
| Example 4 | " | Trimethylolpropane derivative of diphenylmethane diisocyanate |

TABLE 3-continued

| | Block copolymer | Polyfunctional isocyanate |
|---|---|---|
| Example 5 | " | Trimethylolpropane derivative of tolylene diisocyanate |
| Example 6 | " | Trimethylolpropane derivative of hexamethylene diisocyanate |
| Example 7 | " | Isocyanuric ring derivative of hexamethylene diisocyanate |
| Example 8 | Block copolymer (2) | Diphenylmethane diisocyanate |
| Example 9 | " | Trimethylolpropane derivative of tolylene diisocyanate |

TABLE 4

| | Block copolymer | Polyfunctional isocyanate |
|---|---|---|
| Example 10 | Block copolymer (3) | Diphenylmethane diisocyanate |
| Example 11 | Block copolymer (4) | " |
| Example 12 | Block copolymer (5) | " |
| Example 13 | Block copolymer (6) | " |
| Example 14 | Block copolymer (7) | " |
| Example 15 | Block copolymer (8) | " |
| Example 16 | Block copolymer (9) | " |
| Example 17 | Block copolymer (10) | " |
| Example 18 | Block copolymer (11) | " |
| Example 19 | Block copolymer (12) | " |
| Example 20 | Block copolymer (13) | " |
| Example 21 | Block copolymer (14) | " |
| Example 22 | Block copolymer (15) | " |
| Example 23 | Block copolymer (15) | Trimethylolpropane derivative of tolylene diisocyanate |

TABLE 5

| | Block copolymer or random copolymer | Polyfunctional isocyanate |
|---|---|---|
| Example 24 | Block copolymer (16) | Diphenylmethane diisocyanate |
| Example 25 | " | Tolylene diisocyanate |
| Example 26 | " | Hexamethylene diisocyanate |
| Example 27 | " | Trimethylolpropane derivative of diphenylmethane diisocyanate |
| Example 28 | " | Trimethylolpropane derivative of tolylene diisocyanate |
| Example 29 | " | Trimethylolpropane derivative of hexamethylene diisocyanate |
| Example 30 | " | Isocyanuric ring derivative of hexamethylene diisocyanate |
| Comparative Example 1 | Random copolymer (1) | Diphenylmethane diisocyanate |
| Comparative Example 2 | " | Trimethylolpropane derivative of tolylene diisocyanate |

The pressure-sensitive adhesive sheets of Examples 1 to 30 and Comparative Examples 1 and 2 were measured for pressure-sensitive adhesive force and cohesive force (creep) in the following manner. The results obtained are shown in Tables 6 and 7 below.

Pressure-sensitive Adhesive Force

The various pressure-sensitive adhesive sheets were each cut into a strip having a width of 20 mm and a length of 80 mm. The strip thus prepared was press-bonded to an SUS-304 plate having a width of 40mm and a length of 100 mm by one reciprocation of a rubber roller having a weight of 2 kg over the strip. The laminate was allowed to standat room temperature for 30 minutes. Using a tensile testing machine, the pressure-sensitive adhesive sheet was peeled off the plate at an angle of 180°, a temperature of 25° C. and a rate of 300 mm/min to measure the force required for peeling. The measurement was made on two samples for each pressure-sensitive adhesive sheet. The measurement values were averaged.

Cohesive Force

The various pressure-sensitive adhesive sheets were each applied to a bakelite plate at an area of 10 mm width and 20 mm length. The falling distance per hour was measured at a temperature of 40° C. under a load of 500 g. It is generally known that the smaller the moving distance is, the greater is the cohesive force.

TABLE 6

|  | Pressure-sensitive adhesive force (g/20 mm width) | Cohesive force (mm/hr) |
| --- | --- | --- |
| Example 1 | 585 | 0.25 |
| Example 2 | 665 | 0.20 |
| Example 3 | 650 | 0.35 |
| Example 4 | 530 | 0.14 |
| Example 5 | 573 | 0.11 |
| Example 6 | 569 | 0.09 |
| Example 7 | 622 | 0.11 |
| Example 8 | 582 | 0.44 |
| Example 9 | 531 | 0.25 |
| Example 10 | 590 | 0.32 |
| Example 11 | 565 | 0.70 |
| Example 12 | 458 | 0.15 |
| Example 13 | 517 | 0.09 |
| Example 14 | 594 | 0.89 |
| Example 15 | 571 | 0.33 |
| Example 16 | 573 | 0.26 |
| Example 17 | 540 | 0.27 |
| Example 18 | 520 | 0.24 |
| Example 19 | 630 | 0.70 |
| Example 20 | 685 | 0.95 |
| Example 21 | 605 | 0.70 |
| Example 22 | 497 | 0.37 |
| Example 23 | 478 | 0.31 |

TABLE 7

|  | Pressure-sensitive adhesive force (g/20 mm width) | Cohesive force (mm/hr) |
| --- | --- | --- |
| Example 24 | 627 | 0.45 |
| Example 25 | 642 | 0.54 |
| Example 26 | 662 | 0.60 |
| Example 27 | 578 | 0.22 |
| Example 28 | 563 | 0.30 |
| Example 29 | 522 | 0.35 |
| Example 30 | 685 | 0.43 |
| Comparative Example 1 | 320 | 0.24 |
| Comparative Example 2 | 295 | 0.11 |

As can be seen in Tables 6 and 7 above, all the pressure-sensitive adhesive sheets of Examples 1 to 30 according to the present invention exhibit excellent pressure-sensitive adhesive properties, i.e., great pressure-sensitive adhesive force and cohesive force while the pressure-sensitive adhesive sheets of Comparative Examples 1 and 2 exhibit a poor pressure-sensitive adhesive force.

Pressure-sensitive adhesive compositions comprising a crosslinked polymer obtained by epoxy-crosslinking an A-B type block copolymer according to Examples 31 to 54 will be described hereinafter as compared with pressure-sensitive adhesive compositions according to Comparative Examples 31 and 32.

The block copolymers (31) to (41) used in the above Examples and the random copolymers (42) and (43) used in the foregoing comparative examples were prepared by the following above Examples 31 to 41 and Comparative Preparation Examples 31 and 32, respectively.

In the following Preparation Examples 31 to 41, 2-hydroxyethyl 2-bromopropionate (hereinafter simply referred to as "2-H2PN"), 2-hydroxybutyl 2-bromo-2-methylpropionate (hereinafter simply referred to as "2-H2PN"), 3,4-epoxycyclohexylmethyl 2-bromo-2-methylpropionate (hereinafter simply referred to as "2-MPE") and 3,4-epoxycyclohexyl 2-bromopropionate (hereinafter simply referred to as "2-HPE"), which are polymerization initiators, were synthesized by the following methods.

Synthesis of 2-H2PN 4.1 g (20 mmol) of dicyclohexyl carbodiimide, 5 g (81 mmol) of anhydrous ethylene glycol and 1 ml (12 mmol) of pyridine were charged into a reaction vessel. To the mixture was added a mixture of 14 ml of acetone and 1.5 ml (16.7 mmol) of 2-bromopropionic acid while being cooled over ice bath to suppress the exothermic reaction. After completion of the reaction overnight, the resulting precipitate was recovered by filtration. To the filtrate 20 ml of ethyl acetate and 15 ml of saturated brine were added. The mixture was then allowed to stand for a while. The resulting upper ethyl acetate layer was washed twice with diluted hydrochloric acid and then three times with 15 ml of saturated brine, and then dried over anhydrous magnesium sulfate. Magnesium sulfate was removed. Ethyl acetate was distilledoff under reducedpressure toobtain a crude product. The crude product thus obtained was purified through silica gel chromatography (developing solvent: 1/1 mixture of ethyl acetate and hexane) to obtain 2-H2PN as the desired product. The yield of 2-H2PN was 1 .4 g (43% by weight)

Synthesis of 2-H2MPN

2-H2MPN was synthesized in the same manner as in 2-H2PN except that 2-bromo-2-methylpropionic acid was used instead of 2-bromopropionic acid.

Synthesis of 2-MPE 41.7 g (326 mmol) of 3,4-epoxycyclohexylmethyl alcohol, 50 ml (359 mmol) of triethylamine, 10 ml (124 mmol) of pyridine and 350 ml of acetone were charged into a reaction vessel. To the mixture was added a mixture of 15 ml of acetone and 40.3 ml (326 mmol) of 2-bromo-2-methylpropionic acid bromide while being cooled over ice bath to suppress the exothermic reaction. After completion of the reaction overnight, the resulting precipitate was recovered by filtration. Acetone was distilled off under reduced pressure to obtain a crude product. The crude product thus obtained was purified through silica gel chromatography (developing solvent: 2/1 mixture of acetone and hexane) to obtain 2-MPE as the desired product. The yield of 2-MPE was 34 g (38%)

Synthesis of 2-HPE

2-HPE was synthesized in the same manner as in 2-MPE except that 2-bromopropionic acid bromide was used instead of 2-bromo-2-methylpropionic acid bromide.

PREPARATION EXAMPLE 31

Into a four-necked flask equipped with a mechanical stirrer, a nitrogen inlet, a condenser and a rubber septum was charged 45.5 g (438 mmol) of styrene. To the content of the flask was then added 2.05 g (13.1 mmol) of 2,2'-bipyridine. The air in the reaction system was replaced by nitrogen. In a stream of nitrogen, the reaction mixture was heated to a temperature of 90° C. with 626 mg (4.36 mmol) of copper bromide (I) added thereto in the presence of 923 mg (4.37 mmol) of 2-H2MPN as a polymerization initiator to initiate polymerization. The polymerization was effected free from solvent at a temperature of 90° C. for 12 hours. When the conversion (hereinafter the value obtained by dividing the weight of the polymer from which volatile components have been removed by heating by the initial weight of the polymer solution) was confirmed to have reached 80% by weight or more, 182 g (1,420 mmol) of n-butyl acrylate was added to the polymer solution through the rubber septum. The polymer solution was further heated for 20 hours.

When the conversion was again confirmed to have reached 80% by weight or more, 1.13 g (6.56 mmol) of 6-hydroxyhexyl acrylate was added to the polymerization system. The polymerization solution was polymerized overnight. The polymerized product thus obtained was diluted with ethyl acetate to a concentration of about 20% by weight. The catalyst was removed by filtration. Then, $H^+$-type resin (e.g., Indion 130, 10 wt % to the block polymer) was added into this filtrate and the mixture was stirred at 1.4° C. for 1 hour to remove bipyridine. Finally, ethyl acetate was evaporated at a temperature of 60° C. under reduced pressure to prepare an A-B type block copolymer (31) in the form of oily polymer.

PREPARATION EXAMPLES 32 To 41

A-B type block copolymers (32) to (41) in the form of oily polymer were prepared in the same manner as in Preparation Example 31 except that the charged amount of styrene and n-butyl acrylate, the kind and amount of the polymerization initiator and the kind and amount of the hydroxyl group-or epoxy group-containing monomer were changed as shown in Table 8. During each of the polymerization processes, the molar amount of copper bromide (I) to be used was the same as that of the polymerization initiator, and the molar amount of 2,2'-bipyridine was three times that of the polymerization initiator.

In Table 8, the abbreviation "6-HA" indicates 6-hydroxyhexyl acrylate, the abbreviation "2-HEA" indicates 2-hydroxyethyl acrylate and the abbreviation "3,4-ECMA" indicates 3,4-epoxycyclohexylmethyl acrylate. In Table 8, the figure in the parenthesis indicates the molar amount (mmol) of the respective starting material component. Table 8 also contains the starting materials used in Preparation Example 31.

TABLE 8

| | Charged amount of styrene (mmol) | Charged amount of n-butyl acrylate (mmol) | Kind and amount of polymerization initiator (mmol) | Kind and amount of hydroxyl group- or epoxy group-containing monomer (mmol) |
|---|---|---|---|---|
| Preparation Example 31 | 45.5 g (438) | 182 g (438) | 2-H2MPN (4.37) | 6-HHA (6.56) |
| Preparation Example 32 | 45.5 g (438) | 182 g (438) | 2-H2MPN (4.37) | 6-HHA (4.37) |
| Preparation Example 33 | 22.8 g (219) | 182 g (438) | 2-H2MPN (4.37) | 6-HHA (6.56) |
| Preparation Example 34 | 45.5 g (438) | 182 g (438) | 2-H2MPN (8.74) | 6-HHA (8.74) |
| Preparation Example 35 | 45.5 g (438) | 182 g (438) | 2-H2MPN (4.37) | 2-HHA (6.56) |
| Preparation Example 36 | 45.5 g (438) | 182 g (438) | 2-H2MPN (4.37) | 6-HHA (6.56) |
| Preparation Example 37 | 45.5 g (438) | 182 g (438) | 2-MPE (4.37) | 3,4-ECMA (6.56) |
| Preparation Example 38 | 45.5 g (438) | 182 g (438) | 2-MPE (4.37) | 3,4-ECMA (4.37) |
| Preparation Example 39 | 45.5 g (438) | 182 g (438) | 2-HPE (4.37) | 3,4-ECMA (6.56) |

TABLE 8-continued

| | Charged amount of styrene (mmol) | Charged amount of n-butyl acrylate (mmol) | Kind and amount of polymerization initiator (mmol) | Kind and amount of hydroxyl group- or epoxy group-containing monomer (mmol) |
|---|---|---|---|---|
| Preparation Example 40 | 45.5 g (438) | 182 g (438) | 2-MPE (4.37) | 6-HHA (6.56) |
| Preparation Example 41 | 45.5 g (438) | 182 g (438) | 2-H2MPN (4.37) | 3,4-ECMA (6.56) |

The A-B type block copolymers (31) to (41) prepared in Preparation Examples 31 to 41 were measured for number average molecular weight [Mn], weight average molecular weight [Mw] and polymer dispersibility [Mw/Mn]. The results obtained are shown in Table 9 below. For the measurement of molecular weight, GPC method described herein was used.

TABLE 9

| | Sample No. of block copolymer | Mn (×1,000) | Mw (×1,000) | Mw/Mn |
|---|---|---|---|---|
| Preparation Example 31 | Block copolymer (31) | 51.8 | 89.6 | 1.73 |
| Preparation Example 32 | Block copolymer (32) | 53.2 | 90.2 | 1.70 |
| Preparation Example 33 | Block copolymer (33) | 40.8 | 78.6 | 1.93 |
| Preparation Example 34 | Block copolymer (34) | 25.2 | 51.3 | 2.04 |
| Preparation Example 35 | Block copolymer (35) | 50.5 | 86.2 | 1.71 |
| Preparation Example 36 | Block copolymer (36) | 49.8 | 79.9 | 1.60 |
| Preparation Example 37 | Block copolymer (37) | 48.6 | 80.1 | 1.65 |
| Preparation Example 38 | Block copolymer (38) | 50.6 | 90.9 | 1.80 |
| Preparation Example 39 | Block copolymer (39) | 53.2 | 89.6 | 1.68 |
| Preparation Example 40 | Block copolymer (40) | 47.6 | 78.3 | 1.64 |
| Preparation Example 41 | Block copolymer (41) | 51.3 | 92.8 | 1.81 |

COMPARATIVE PREPARATION EXAMPLE 31

Into the same four-necked flask as used in Preparation Example 31 were charged 45.5 g (438 mmol) of styrene, 182 g (1,420 mmol) of n-butyl acrylate, 1.13 g (6.56 mmol) of 6-hydroxyhexyl acrylate, 0.3 g (3.84 mmol) of 2-mercaptoethanol and 400 ml of ethyl acetate. To the mixture was added 0.5 g of azoisobutyrolintrile. The reaction mixture was heated to a temperature of 60° C. for 5 hours to conduct polymerization. After completion of the polymerization, ethyl acetate was evaporated at a temperature of 60° C. under reduced pressure to obtain an oily random copolymer (42). The random copolymer (42) thus obtained had a number average molecular weight [Mn] of 60.8×1,000, a weight average molecular weight [Mw] of 122.3×1,000 and a polymer dispersibility [Mw/Mn] of 2.01.

COMPARATIVE PREPARATION EXAMPLE 32

Into the same four-necked flask as used in Preparation Example 1 were charged 45.5 g (438 mmol) of styrene, 182 g (1,420 mmol) of n-butyl acrylate, 1.19 g (6.56 mmol) of 3,4-epoxycyclohexylmethyl acrylate, 0.3 g (1.48 mmol) of dodecanethiol and 400 ml of ethyl acetate. To the mixture was then added 0.5 g of azoisobutyrolintrile. The reaction mixture was heated to a temperature of 60° C. for 5 hours to conduct polymerization. After completion of the polymerization, ethyl acetate was evaporated at a temperature of 60° C. under reduced pressure to obtain an oily random copolymer (43). The random copolymer (43) thus obtained had a number average molecular weight [Mn] of 59.4×1,000, a weight average molecular weight [Mw] of 136×1000and a polymer dispersibility [Mw/Mn] of 2.29.

EXAMPLE 31

4 g of the A-B type block copolymer (31) was diluted with 4 ml of ethyl acetate. To the solution were added 120 mg of "UV-9380C" [iodonium salt-based curing catalyst produced by Toshiba Silicone Co., Ltd.; a chemical product containing 45% by weight of bis(dodecylphenyl) iodoniumhexafluoroantimonate] and 0.1 g of BEP (3,4-epoxycyclohexylmethyl-3',4'-epoxycylcohexyl carboxylate) as a crosslinking agent. The mixture was uniformly stirred to prepare a pressure-sensitive adhesive composition solution before epoxy-crosslinking. The pressure-sensitive adhesive composition solution thus obtained was applied to a polyethylene terephthalate film (hereinafter referred to as "PET film") having a thickness of 27 $\mu$m by means of an applicator having a gap of 100 $\mu$m, dried at a temperature of 120° C. for 5 minutes, and then irradiated with ultraviolet rays from a high pressure mercury lamp at a dose of 1.3 J at room temperature to epoxy-crosslink, to thereby form an pressure-sensitive adhesive composition layer comprising a crosslinked polymer obtained by crosslinking the block copolymer. Thus, an pressure-sensitive adhesive sheet was obtained.

EXAMPLES 32 to 54

23 kinds of pressure-sensitive adhesive composition solutions before epoxy-crosslinking were prepared in the same manner as in Example 31 except that the kind of the A-B block copolymers (the amount used was not changed) and the kind and amount of the onium salt-based curing catalysts (photo-acid generator) were changed as shown in Tables 10 and 11 and the epoxy-based crosslinking agent to be used was changed in its kind and amount as shown in Tables 10 and 11 or was not used. Further, pressure-sensitive adhesive layers containing a crosslinked polymer of the various block copolymers were formed on the PET film from these composition solutions in the same manner as in Example 31 except that the exposed dose of ultraviolet rays was determined as shown in Tables 10 and 11. Thus, pressure-sensitive adhesive sheets were prepared.

Table 10 also contains the kind of the A-B type block copolymer used in Example 31 and the kind and amount of the onium salt-based curing catalyst used in Example 31 for reference. In Tables 10 and 11, the abbreviations "BBI-102", "BBI-105", "TPS-105", "DPI-105" and "CD1012" as onium-based curing catalysts indicate bis(t-butylphenyl) iodoniumhexafluoro phosphate, bis(t-butylphenyl) iodoniumtrifluoromethane sulfonate, triphenylsulfonium trifluoromethane sulfonate, biphenyliodonium trifluoromethane sulfonate and phenyl(3-hydroxypentadecylphenyl)iodoniumhexafluoroantimonate, respectively. As crosslinking agents (epoxy compounds), the abbreviations "BEP", "EGD", "3EP" and "4EP" are as defined hereinabove.

COMPARATIVE EXAMPLES 31 AND 32

Two kinds of pressure-sensitive adhesive composition solutions before epoxy-crosslinking were prepared in the same manner as in Example 31 except that the random copolymers (42) and (43) were used instead of the block copolymer (the amount used was not changed), respectively, and the kind and amount of the onium salt-based curing catalyst (photo-acid generator) and epoxy crosslinking agent were changed as set forth in Table 11. Pressure-sensitive adhesive layers containing a crosslinked polymer of the random copolymers were then formed on PET film from these solutions in the same manner as in Example 31. Thus, pressure-sensitive adhesive sheets were prepared.

TABLE 10

|  | Block copolymer | Onium salt-based curing catalyst (g) | Cross-linking agent (g) | Dose of ultra-violet rays (J) |
|---|---|---|---|---|
| Example 31 | Block copolymer (31) | UV-9380C (0.12) | BEP (0.1) | 1.3 |
| Example 32 | " | UV-9380C (0.12) | BEP (0.1) | 0.26 |
| Example 33 | " | UV-9380C (0.12) | BEP (0.1) | 2.6 |
| Example 34 | " | BBI-102 (0.06) | BEP (0.1) | 1.3 |
| Example 35 | " | BBI-102 (0.12) | BEP (0.1) | " |
| Example 36 | " | BBI-102 (0.06) | BEP (0.2) | " |
| Example 37 | " | BBI-102 (0.06) | EGD (0.1) | " |
| Example 38 | " | BBI-102 (0.06) | 3EP (0.1) | " |
| Example 39 | " | BBI-102 (0.06) | 4EP (0.1) | " |
| Example 40 | " | BBI-105 (0.06) | BEP (0.1) | " |
| Example 41 | " | TPS-105 (0.06) | BEP (0.1) | " |
| Example 42 | " | DPI-105 (0.06) | BEP (0.1) | " |
| Example 43 | " | CD1012 (0.06) | BEP (0.1) | " |
| Example 44 | Block copolymer (32) | BBI-102 (0.06) | BEP (0.1) | " |
| Example 45 | Block copolymer (33) | BBI-102 (0.06) | BEP (0.1) | " |
| Example 46 | Block copolymer (34) | BBI-102 (0.06) | BEP (0.1) | " |
| Example 47 | Block copolymer (35) | BBI-102 (0.06) | BEP (0.1) | " |
| Example 48 | Block copolymer (36) | BBI-102 (0.06) | BEP (0.1) | " |

TABLE 11

|  | Block copolymer | Onium salt-based curing catalyst (g) | Cross-linking agent (g) | Dose of ultra-violet rays (J) |
|---|---|---|---|---|
| Example 49 | Block copolymer (37) | BBI-102 (0.06) | Not used | 1.3 |
| Example 50 | " | BBI-102 (0.06) | BEP (0.1) | " |
| Example 51 | Block copolymer (38) | BBI-102 (0.06) | BEP (0.1) | " |
| Example 52 | Block copolymer (39) | BBI-102 (0.06) | BEP (0.1) | " |
| Example 53 | Block copolymer (40) | BBI-102 (0.06) | BEP (0.1) | " |
| Example 54 | Block copolymer (41) | BBI-102 (0.06) | BEP (0.1) | " |
| Comparative Example 31 | Random copolymer (42) | BBI-102 (0.06) | BEP (0.1) | " |

TABLE 11-continued

| | Block copolymer | Onium salt-based curing catalyst (g) | Cross-linking agent (g) | Dose of ultra-violet rays (J) |
|---|---|---|---|---|
| Comparative Example 32 | Random copolymer (43) | BBI-102 (0.06) | BEP (0.1) | " |

The pressure-sensitive adhesive sheets of Examples 31 to 54 and Comparative Examples 31 and 32 were measured for pressure-sensitive adhesive force and holding force (cohesive force) in the following manner. The results obtained are shown in Tables 12 and 13 below.

Measurement of Pressure-sensitive Adhesive Force

The various pressure-sensitive adhesive sheets were each cut into a strip having a width of 20 mm and a length of 80 mm. The strip thus prepared was press-bonded to an SUS-304 plate having a width of 40 mm and a length of 100 mm by one reciprocation of a rubber roller having a weight of 2 kg once over the strip. The laminate was allowed to stand at room temperature for 30 minutes. Using a tensile testing machine, the pressure-sensitive adhesive sheet was peeled off the plate at an angle of 180°, a temperature of 25° C. and a rate of 300 mm/min to measure the force required for peeling. The measurement was made on two samples for each pressure-sensitive adhesive sheet. The measurement values were averaged.

Measurement of Holding Force

The various pressure-sensitive adhesive sheets were each applied to a bakelite plate at an area of 10 mm width and 20 mm length. The falling distance per hour was then measured at a temperature of 40° C. under a load of 500 g. It is generally known that the smaller the falling distance is, the greater is the cohesive force.

TABLE 12

| | Pressure-sensitive adhesive force (g/20 mm width) | Holding force (mm/hr) |
|---|---|---|
| Example 31 | 572 | 0.18 |
| Example 32 | 373 | 0.39 |
| Example 33 | 682 | 0.19 |
| Example 34 | 579 | 0.19 |
| Example 35 | 552 | 0.20 |
| Example 36 | 568 | 0.21 |
| Example 37 | 397 | 0.38 |
| Example 38 | 406 | 0.18 |
| Example 39 | 478 | 0.11 |
| Example 40 | 370 | 0.17 |
| Example 41 | 405 | 0.19 |
| Example 42 | 466 | 0.22 |
| Example 43 | 555 | 0.15 |
| Example 44 | 586 | 0.22 |
| Example 45 | 465 | 0.32 |
| Example 46 | 459 | 0.15 |
| Example 47 | 520 | 0.20 |
| Example 48 | 494 | 0.27 |

TABLE 13

| | Pressure-sensitive adhesive force (g/20 mm width) | Holding force (mm/hr) |
|---|---|---|
| Example 49 | 471 | 0.55 |
| Example 50 | 430 | 0.25 |

TABLE 13-continued

| | Pressure-sensitive adhesive force (g/20 mm width) | Holding force (mm/hr) |
|---|---|---|
| Example 51 | 572 | 0.44 |
| Example 52 | 345 | 0 27 |
| Example 53 | 465 | 0.24 |
| Example 54 | 630 | 0 41 |
| Comparative Example 31 | 280 | 0.56 |
| Comparative Example 32 | 295 | 0.48 |

As can be seen from Tables 12 and 13 above, all the pressure-sensitive adhesive sheets of Examples 31 to 54 comprising as a main component a crosslink ed polymer obtained by epoxy-crosslinking block copolymers obtained by living radical polymerization exhibit excellent pressure-sensitive adhesive properties, i.e., great pressure-sensitive adhesive force and cohesive force. Further, the various pressure-sensitive adhesive sheets according to Examples 31 to 54 exhibit an excellent light resistance based on the acrylic polymer block B and an excellent heat resistance based on the epoxy crosslinking treatment. Moreover, since these pressure-sensitive adhesives are prepared free from a large amount of a solvent or water, no problems occur in economy, working atmosphere, safety, etc. as well as in pot life.

On the other hand, the pressure-sensitive adhesive sheets according to Comparative Examples 31 and 32 comprising as a main component a crosslinked polymer obtained by epoxy-crosslinking an ordinary random copolymer are poor in the pressure-sensitive adhesive properties. In particular, these pressure-sensitive adhesive sheets exhibit a definitely small pressure-sensitive adhesive force.

Pressure-sensitive adhesive compositions comprising a crosslinked polymer obtained by crosslinking an A-B-A type block copolymer according to Examples 61 to 93 will be described hereinafter as compared with pressure-sensitive adhesive compositions according to Comparative Examples 61 and 63.

The A-B-A type block copolymers (61) to (67) used in the above Examples and the random copolymer (68) used in the above Comparative Examples were prepared by the following Preparation Examples 61 to 67 and Comparative Preparation Example 1, respectively. In these Preparation Examples, the starting materials used are mostly commercially available products. However, 2-hydroxyethyl 2-bromo-2-methylpropionate (hereinafter simply referred to as "2-H2MPN"), which was used as a polymerization initiator having a hydroxyl group in its molecule, was synthesized by the following method.

Synthesis of 2-H2MPN

Excess amounts of ethylene glycol (44 ml (788 mmol)), triethylamine (100 ml (717 mmol)) and pyridine (20 ml (200 mmol)) were charged into a reaction vessel. To the mixture were added 800 ml of acetone and 150 g (652 mmol) of 2-bromoisobutylyl bromide while being cooled over ice bath to suppress the exothermic reaction. After 16 hours of reaction, the resulting precipitate was recovered by filtration. To the precipitate thus recovered were added 1 liter of ethyl acetate and 500 ml of saturated brine. The mixture was thoroughly shaken. The mixture was allowed to stand for a while. The resulting upper ethyl acetate layer was washed twice with diluted hydrochloric acid and then three times with 500 ml of saturated brine, and then dried over anhydrous magnesium sulfate. Magnesium sulfate was removed.

Ethyl acetate was distilled off under reduced pressure to obtain a crude product. The crude product thus obtained was purified by distillation method (87 to 90° C./0.25 mmHg) to obtain 2-H2MPN as the desired product. The yield of 2-H2MPN was 88 g (64% by weight).

PREPARATION EXAMPLE 61

Into a four-necked flask equipped with a mechanical stirrer, a nitrogen inlet, a condenser and a rubber septum was charged 14.2 g (137 mmol) of styrene. To the content of the flask was added 1.3 g (8.3 mmol) of 2,2'-bipyridine. The air in the reaction system was replaced by nitrogen. In a stream of nitrogen, the reaction mixture was heated to a temperature of 90° C. with 410 mg (2.84 mmol) of copper bromide (I) added thereto in the presence of 600 mg (2.84 mmol) of 2-H2MPN as a polymerization initiator to initiate polymerization. The polymerization was effected free from solvent at a temperature of 90° C. for 12 hours. When the conversion (hereinafter the value obtained by dividing the weight of the polymer from which volatile components have been removed by heating by the initial weight of the polymer solution) was confirmed to have reached 80% by weight or more, 85 g (662 mmol) of n-butyl acrylate was added to the polymer solution through the rubber septum. The polymer solution was further heated to a temperature of 110° C. for 20 hours. When the conversion was again confirmed to have reached 80% by weight or more, 14.2 g (137 mmol) of styrene was added to the polymerization system through the rubber septum. The polymerization solution was heated to a temperature of 90° C. for 20 hours. The polymerized product thus obtained was diluted with ethyl acetate to a concentration of about 20% by weight. The catalyst was removed by filtration. Then, $H^+$-type resin (e.g., Indion 130, 10 wt % to the block polymer) was added into this filtrate and the mixture was stirred at 1.4° C. for 1 hour to remove bipyridine. Finally, ethyl acetate was evaporated at a temperature of 50° C. under reduced pressure to prepare an A-B-A type block copolymer (61) in the form of oily polymer.

PREPARATION EXAMPLE 62

Into a four-necked flask equipped with a mechanical stirrer, a nitrogen inlet, a condenser and a rubber septum was charged 14.2 g (137 mmol) of styrene. To the content of the flask was added 1.3 g (8.3 mmol) of 2,2'-bipyridine. The air in the reaction system was replaced by nitrogen. In a stream of nitrogen, the reaction mixture was heated to a temperature of 90° C. with 410 mg (2.84 mmol) of copper bromide (I) added thereto in the presence of 600 mg (2.84 mmol) of 2-H2MPN as a polymerization initiator to initiate polymerization. The polymerization was effected free from solvent at a temperature of 90° C. for 12 hours. When the conversion was confirmed to have reached 80% by weight or more, 85 g (662 mmol) of n-butyl acrylate was added to the polymer solution through the rubber septum. The polymer solution was further heated to a temperature of 110° C. for 20 hours. When the conversion was again confirmed to have reached 80% by weight or more, 7:40 mg (4.28 mmol) of 6-hydroxyhexyl acrylate was added to the polymerization system. The polymerization solution was polymerized for 16 hours. Finally, to the polymerization solution was added 14.2 g (137 mmol) of styrene through the rubber septum. The polymerization solution was heated to a temperature of 90° C. for 20 hours. The polymerized product thus obtained was diluted with ethyl acetate to a concentration of about 20% by weight. The catalyst was removed by filtration. Then, $H^+$-type resin (e.g., Indion 130, 10 wt % to the block polymer) was added into this filtrate and the mixture was stirred at 1.4° C. for 1 hour to remove bipyridine. Finally, ethyl acetate was evaporated at a temperature of 50° C. under reduced pressure to prepare an A-B-A type block copolymer (62) in the form of oily polymer.

PREPARATION EXAMPLES 63 TO 66

A-B-A type block copolymers (63) to (66) in the form of oily polymer were prepared in the same manner as in Preparation Example 62 except that the amount of styrene charged in the first stage, the kind and amount of the acrylic monomer charged in the second stage and the amount of styrene charged in the third stage initiator were changed as shown in Table 14 although the charged amount of 2-H2MPN as a polymerization initiator and the charged amount of 6-hydroxyhexyl acrylate as an acrylic monomer having a hydroxyl group in its molecule were not changed. During each of the polymerization processes, the molar amount of copper bromide (I) to be used was the same as that of the polymerization initiator, and the molar amount of 2,2'-bipyridine was three times that of the polymerization initiator. Table 14 also contains the amount of the monomers used in the first to third stages in Preparation Example 62 for reference.

In Table 14, the abbreviation "BA" indicates n-butyl acrylate, the abbreviation "2-HEA" indicates 2-hydroxyethyl acrylate, and the abbreviation "HA" indicates hexyl acrylate. In Table 14, the figure in the parenthesis indicates the molar amount (mmol) of the respective starting material component.

TABLE 14

| | Styrene charged in 1st stage (mmol) | Kind and amount of acrylic monomer charged in 2nd stage (mmol) | Styrene charged in 3rd stage (mmol) |
|---|---|---|---|
| Preparation Example 62 | 14.2 g (137) | BA 85 g (662) | 14.2 g (137) |
| Preparation Example 63 | 28.4 g (273) | BA 85 g (662) | 28.4 g (273) |
| Preparation Example 64 | 7.1 g (69) | 2EHA 85 g (461) | 7.1 (69) |
| Preparation Example 65 | 7.1 g (69) | HA 85 g (544) | 7.1 g (69) |
| Preparation Example 66 | 14.2 g (137) | BA 43 g (335) 2EHA 43 g (233) | 14.2 g (137) |

PREPARATION EXAMPLE 67

Into a four-necked flask equipped with a mechanical stirrer, a nitrogen inlet, a condenser and a rubber septum was charged 14.2 g (137 mmol) of styrene. To the content of the flask was added 1.3 g (8.3 mmol) of 2,2'-bipyridine. The air in the reaction system was replaced by nitrogen. In a stream of nitrogen, the reaction mixture was heated to a temperature of 90° C. with 410 mg (2.84 mmol) of copper bromide (I) added thereto in the presence of 600 mg (2.84 mmol) of 2-H2MPN as a polymerization initiator to initiate polymerization. The polymerization was effected free from solvent at a temperature of 90° C. for 12 hours. When the conversion was confirmed to have reached 80% by weight or more, 85 g (662 mmol) of n-butyl acrylate was added to the polymer solution through the rubber septum. The polymer solution was further heated to a temperature of 110° C. for 20 hours. When the conversion was again confirmed to have reached 80% by weight or more, 14.2 mg (137 mmol) of styrene was added to the polymerization solution through the rubber septum. The polymerization solution was heated to a temperature of 90° C. for 20 hours. Finally, 740 mg (4.28 mmol) of 6-hydroxyhexyl acrylate was added to the polymerization system. The polymerization solution was polymerized for 16 hours. The polymerized product thus obtained was diluted with ethyl acetate to a concentration of about 20% by weight. The catalyst was removed by filtration. Then, H$^+$-type resin (e.g., Indion 130, 10 wt % to the block polymer) was added into this filtrate and the mixture was stirred at 1.4° C. for 1 hour to remove bipyridine. Finally, ethyl acetate was evaporated at a temperature of 50° C. under reduced pressure to prepare an A-B-A type block copolymer (67) in the form of oily polymer.

The A-B-A type block copolymers (61) to (67) prepared in Preparation Examples 61 to 67 were measured for number average molecular weight [Mn], weight average molecular weight [Mw] and polymer dispersibility [Mw/Mn]. The results obtained are shown in Table 15 below. For the measurement of molecular weight, GPC method described herein was used.

TABLE 15

| | Sample No. of block copolymer | Mn (x 1,000) | Mw (x 1,000) | Mw/Mn |
|---|---|---|---|---|
| Preparation Example 61 | Block copolymer (61) | 42.0 | 79.2 | 1.89 |
| Preparation Example 62 | Block copolymer (62) | 44.1 | 78.6 | 1.78 |
| Preparation Example 63 | Block copolymer (63) | 52.7 | 104.0 | 1.97 |
| Preparation Example 64 | Block copolymer (64) | 49.2 | 99.1 | 2.01 |
| Preparation Example 65 | Block copolymer (65) | 39.6 | 78.6 | 1.98 |
| Preparation Example 66 | Block copolymer (66) | 47.8 | 90.1 | 1.88 |
| Preparation Example 67 | Block copolymer (67) | 42.1 | 83.1 | 1.97 |

COMPARATIVE PREPARATION EXAMPLE 61

Into a four-necked flask equipped with a mechanical stirrer, a nitrogen inlet, a condenser and a rubber septum were charged 45.5 g (438 mmol) of styren 182 g (1,420 mmol) of n-butyl acrylate, 0.3 g (3.84 mmol) of 2-mercaptoethanol, 1.13 g (6.56 mmol) of 6-hydroxyhexyl acrylate and 400 ml of ethyl acetate. To the mixture was added 0.5 g of azoisobutyrolintrile. The reaction mixture was heated to a temperature of 60° C. for 5 hours to conduct polymerization. Then, H$^+$-type resin (e.g., Indion 130, 10 wt % to the block polymer) was added into this filtrate and the mixture was stirred at 1.4° C. for 1 hour to remove bipyridine. Finally, ethyl acetate was evaporated at a temperature of 60° C. under reduced pressure to obtain an oily random copolymer (68). The random copolymer (68) thus obtained had a number average molecular weight [Mn] of 60.8×1,000, a weight average molecular weight [Mw] of 122.3×1,000 and a polymer dispersibility [Mw/Mn] of 2.01.

EXAMPLE 61

4 g of the A-B-A type block copolymer (61) was diluted with 2 ml of ethyl acetate. To the solution were added 300 mg of a 1 wt % toluene solution of dibutyltin laurate and 300 mg of a 10 wt % toluene solution of diphenylmethane diisocyanate as a crosslinking agent to obtain a pressure-sensitive adhesive composition before crosslinking. Subsequently, the pressure-sensitive adhesive composition thus obtained was applied to a polyethylene terephthalate film (hereinafter referred to as "PET film") having a thickness of 25 μm by means of an applicator having a gap of 200 μm, and dried at a temperature of 120° C. for 5 minutes and then at a temperature of 50° C. for 16 hours to form a pressure-sensitive adhesive composition layer comprising a crosslinked polymer obtained by crosslinking the block copolymer (61) Thus, an pressure-sensitive adhesive sheet was obtained.

EXAMPLES 62 TO 74

Various pressure-sensitive adhesive composition layers comprising a crosslinked polymer of block copolymer were formed on PET film in the same manner as in Example 61 except that the kind of the block copolymers and polyfunctional isocyanates used were changed, respectively, as shown in Tables 16 to 17 below (the amount of the two components used were not changed). Thus, pressure-sensitive adhesive sheets were obtained. Table 16 also contains the kind of block copolymer and polyfunctional isocyanate used in Example 61 for reference.

COMPARATIVE EXAMPLES 61 AND 62

Pressure-sensitive adhesive composition layers containing a crosslinked polymer of the random copolymer were each formed on PET film in the same manner as in Example 61 except that the random copolymer (68) was used instead of the block copolymer (61) and the compound as shown in Table 17 (the amount of the two components used were not changed) was used as the polyfunctional isocyanate. Thus, pressure-sensitive adhesive sheets were prepared.

TABLE 16

| | Block copolymer | Polyfunctional isocyanate |
|---|---|---|
| Example 61 | Block copolymer (61) | Diphenylmethane diisocyanate |
| Example 62 | Block copolymer (61) | Trimethylolpropane derivative of tolylene diisocyanate |
| Example 63 | Block copolymer (62) | Diphenylmethane diisocyanate |
| Example 64 | Block copolymer (62) | Tolylene diisocyanate |
| Example 65 | Block copolymer (62) | Hexamethylene diisocyanate |
| Example 67 | Block copolymer (62) | Trimethylolpropane derivative of diphenylmethane diisocyanate |
| Example 67 | Block copolymer (62) | Trimethylolpropane derivative of tolylene diisocyanate |
| Example 68 | Block copolymer (62) | Trimethylolpropane derivative of hexamethylene diisocyanate |
| Example 69 | Block copolymer (62) | Isocyanuric ring derivative of hexamethylene diisocyanate |

TABLE 17

| | Block copolymer or random copolymer | Polyfunctional isocyanate |
|---|---|---|
| Example 70 | Block copolymer (63) | Isocyanuric ring derivative of hexamethylene diisocyanate |
| Example 71 | Block copolymer (64) | Isocyanuric ring derivative of hexamethylene diisocyanate |
| Example 72 | Block copolymer (65) | Isocyanuric ring derivative of hexamethylene diisocyanate |
| Example 73 | Block copolymer (66) | Isocyanuric ring derivative of hexamethylene diisocyanate |
| Example 74 | Block copolymer (67) | Isocyanuric ring derivative of hexamethylene diisocyanate |
| Comparative Example 1 | Random copolymer (68) | Diphenylmethane diisocyanate |

TABLE 17-continued

| | Block copolymer or random copolymer | Polyfunctional isocyanate |
|---|---|---|
| Comparative Example 2 | Random copolymer (68) | Trimethylolpropane derivative of tolylene diisocyanate |

EXAMPLE 75

4 g of the A-B-A type block copolymer (61) was diluted with 4 ml of ethyl acetate. To the solution were added 120 mg of "UV-9380C" [iodonium salt-based curing catalyst produced by Toshiba Silicone Co., Ltd.; a chemical product containing 45% by weight of bis (dodecylphenyl) iodoniumhexafluoroantimonate] and 0.1 g of BEP (3,4-epoxycycohexylmethyl-3', 4'-epoxycylcohexyl carboxylate) as a crosslinking agent. The mixture was uniformly stirred to prepare an uncrosslinked pressure-sensitive adhesive composition solution. The pressure-sensitive adhesive composition solution thus obtained was applied to PET film having a thickness of 25 μm by means of an applicator having a gap of 100 μm, dried at a temperature of 120° C. for 5 minutes, and then irradiated with ultraviolet rays from a high pressure mercury lamp at an exposed dose of 1.3 J at room temperature to crosslink the same to thereby form an pressure-sensitive adhesive composition layer comprising a crosslinked polymer obtained by crosslinking the foregoing block copolymer (61). Thus, a pressure-sensitive adhesive sheet was obtained.

EXAMPLES 76 TO 93

Uncrosslinked pressure-sensitive adhesive composition solutions were prepared in the same manner as in Example 75 except that the kind of the block copolymers (the amount used was not changed) and the kind and amount of the onium salt-based curing catalysts (photo-acid generator) and the epoxy-based crosslinking agents to be used were changed as shown in Table 18. Further, pressure-sensitive adhesive layers containing a crosslinked polymer of the various block copolymers were formed on the PET film from these composition solutions in the same manner as in Example 75 except that the dose.of ultraviolet rays was determined as shown in Table 18. Thus, pressure-sensitive adhesive sheets were prepared. Table 18 also contains the kind of the block copolymer used in Example 75 and the kind and amount of the onium salt-based curing catalyst used in Example 75 for reference.

In Table 18, the abbreviations "BBI-102", "BBI-105", "TPS-105", "DPI-105" and "CD1012" as onium-based curing catalysts indicate bis(t-butylphenyl)iodoniumhexafluoro phosphate, bis(t-butylphenyl)iodoniumtrifluoromethane sulfonate, triphenylsulfonium trifluoromethane sulfonate, biphenyliodonium trifluoromethane sulfonate and phenyl (3-hydroxy-pentadecylphenyl) iodoniumhexafluoroantimonate, respectively. The abbreviations "BEP", "EGD", "3EP" and "4EP"as epoxy-based crosslinking agents are the same as defined hereinabove.

COMPARATIVE EXAMPLE 63

Uncrosslinked pressure-sensitive adhesive composition solutions were prepared in the same manner as in Example 75 except that the random copolymer (68) was used instead of the block copolymer (the amount used was not changed) and the kind and amount of the onium salt-based curing catalysts (photo-acid generator) and epoxy-based crosslinking agents to be used were changed as shown in Table 18. Further, pressure-sensitive adhesive composition layers containing a crosslinked polymer of the random copolymers were each formed from these composition solutions on PET film in the same manner as in Example 75 to prepare pressure-sensitive adhesive sheets.

TABLE 18

| | Block copolymer | Onium salt-based curing catalyst (g) | Crosslinking agent (g) | Dose of ultraviolet rays (J) |
|---|---|---|---|---|
| Example 75 | Block copolymer (61) | UV-9380C (0.12) | BEP (0.1) | 1.3 |
| Example 76 | Block copolymer (61) | BBI-102 (0.06) | BEP (0.1) | 1.3 |
| Example 77 | Block copolymer (62) | UV-102 (0.12) | BEP (0.1) | 0.26 |
| Example 78 | Block copolymer (62) | UV-102 (0.12) | BEP (0.1) | 2.6 |
| Example 79 | Block copolymer (62) | BBI-102 (0.06) | BEP (0.1) | 1.3 |
| Example 80 | Block copolymer (62) | BBI-102 (0.12) | BEP (0.2) | 1.3 |
| Example 81 | Block copolymer (62) | BBI-102 (0.06) | BEP (0.1) | 1.3 |
| Example 82 | Block copolymer (62) | BBI-102 (0.06) | BEP (0.1) | 1.3 |
| Example 83 | Block copolymer (62) | BBI-102 (0.06) | BEP (0.1) | 1.3 |
| Example 84 | Block copolymer (62) | BBI-102 (0.06) | BEP (0.1) | 1.3 |
| Example 85 | Block copolymer (62) | BBI-102 (0.06) | BEP (0.1) | 1.3 |
| Example 86 | Block copolymer (62) | TPS-105 (0.06) | BEP (0.1) | 1.3 |
| Example 87 | Block copolymer (62) | CD1012 (0.06) | BEP (0.1) | 1.3 |
| Example 68 | Block copolymer (62) | BBI-102 (0.06) | BEP (0.1) | 1.3 |
| Example 89 | Block copolymer (63) | BBI-102 (0.06) | BEP (0.1) | 1.3 |
| Example 90 | Block copolymer (64) | BBI-102 (0.06) | BEP (0.1) | 1.3 |
| Example 91 | Block copolymer (65) | BBI-102 (0.06) | BEP (0.1) | 1.3 |
| Example 92 | Block copolymer (66) | BBI-102 (0.06) | BEP (0.1) | 1.3 |
| Example 93 | Block copolymer (67) | BBI-102 (0.06) | BEP (0.1) | 1.3 |
| Comparative Example 63 | Random copolymer (68) | BBI-102 (0.06) | BEP (0.1) | 1.3 |

The pressure-sensitive adhesive sheets of Examples 61 to 93 and Comparative Examples 61 and 63 were measured for pressure-sensitive adhesive force and cohesive force (creep)

in the following manner. The results obtained are shown in Tables 19 and 20 below.

Pressure-sensitive Adhesive Force

The various pressure-sensitive adhesive sheets were each cut into a strip having a width of 20 mm and a length of 80 mm. The strip thus prepared was press-bonded to an SUS-304 plate having a width of 40mm and a length of 100 mm by one reciprocation of a rubber roller having a weight of 2 kg once over the strip. The laminate was then allowed to stand at room temperature for 30 minutes. Using a tensile testing machine, the pressure-sensitive adhesive sheet was peeled off the plate at an angle of 180°, a temperature of 25° C. and a rate of 300 mm/min to measure the force required for peeling. The measurement was made on two samples for each pressure-sensitive adhesive sheet. The measurement values were averaged.

Cohesive Force

The various pressure-sensitive adhesive sheets were each applied to a bakelite plate at an area of 10 mm width and 20 mm length. The falling (sliding) distance per hour was measured at a temperature of 40° C. under a load of 500 g. It is generally known that the smaller the distance is, the greater is the cohesive force.

TABLE 19

|  | Pressure-sensitive adhesive force (g/20 mm width) | Cohesive force (mm/hr) |
| --- | --- | --- |
| Example 61 | 533 | 0.38 |
| Example 62 | 669 | 0.32 |
| Example 63 | 455 | 0.24 |
| Example 64 | 635 | 0.19 |
| Example 65 | 620 | 0.33 |
| Example 66 | 510 | 0.12 |
| Example 67 | 673 | 0.08 |
| Example 68 | 537 | 0.09 |
| Example 69 | 587 | 0.13 |
| Example 70 | 590 | 0.32 |
| Example 71 | 542 | 0.56 |
| Example 72 | 500 | 0.18 |
| Example 73 | 520 | 0.12 |
| Example 74 | 503 | 0.54 |
| Comparative Example 61 | 320 | 0.24 |
| Comparative Example 62 | 295 | 0.11 |

TABLE 20

|  | Pressure-sensitive adhesive force (g/20 mm width) | Cohesive force (mm/hr) |
| --- | --- | --- |
| Example 75 | 463 | 0.11 |
| Example 76 | 566 | 0.22 |
| Example 77 | 275 | 0.29 |
| Example 78 | 587 | 0.17 |
| Example 79 | 589 | 0.16 |
| Example 80 | 531 | 0.11 |
| Example 81 | 500 | 0.17 |
| Example 82 | 403 | 0.28 |
| Example 83 | 421 | 0.19 |
| Example 84 | 505 | 0.08 |
| Example 85 | 395 | 0.16 |
| Example 86 | 411 | 0.18 |
| Example 87 | 455 | 0.22 |
| Example 88 | 520 | 0.16 |
| Example 89 | 480 | 0.32 |
| Example 90 | 427 | 0.26 |
| Example 91 | 525 | 0.20 |
| Example 92 | 453 | 0.18 |
| Example 93 | 448 | 0.26 |

TABLE 20-continued

|  | Pressure-sensitive adhesive force (g/20 mm width) | Cohesive force (mm/hr) |
| --- | --- | --- |
| Comparative Example 63 | 280 | 0.56 |

As can be seen from Tables 19 and 20 above, all the pressure-sensitive adhesive sheets of Examples 61 to 93 according to the present invention exhibit excellent pressure-sensitive adhesive properties, i.e., great pressure-sensitive adhesive force and cohesive force while the pressure-sensitive adhesive sheets of Comparative Examples 61 to 63 exhibit a poor pressure-sensitive adhesive force.

As described above, the present invention can provide a pressure-sensitive adhesive composition which comprises as a main component of pressure-sensitive adhesive a crosslinked polymer obtained by crosslinking a block copolymer comprising at least two of a styrene-based polymer block A and an acrylic polymer block B, e.g., A-B type or B-A type block copolymer or A-B-A type block copolymer, that has been produced free from the conventional safety or economy problems in the absence of solvent or in the presence of a small amount of a solvent to satisfy the desired pressure-sensitive adhesive properties, particularly well-balanced pressure-sensitive adhesive force and cohesive force and excellent heat resistance, in addition to the inherent characteristics due to the acrylic polymer block B, i.e., enhancing the light resistance, a process for the preparation thereof and pressure-sensitive adhesive sheets comprising such a pressure-sensitive adhesive composition.

What is claimed is:

1. A process for the preparation of a pressure-sensitive adhesive composition, which comprises subjecting a styrene-based monomer and an acrylic monomer represented by the general formula (1A): $CH_2=C(R^1)COOR^2$ wherein $R^1$ represents a hydrogen atom or methyl group, and $R^2$ represents a $C_{2-14}$ alkyl group, to a living radical polymerization in an appropriate order of monomers using a polymerization initiator in the presence of a transition metal and its ligand to produce a block copolymer comprising at least two of a styrene-based polymer block A and an acrylic polymer block B bonded to each other, and then subjecting said block copolymer to crosslinking to produce a crosslinked polymer, wherein said styrene-based monomer and said acrylic monomer are subjected to a living radical polymerization together with at least one monomer selected from the group consisting of a monomer having an epoxy group in its molecule and a monomer having a hydroxyl group in its molecule.

2. The process for the preparation of a pressure-sensitive adhesive composition as claimed in claim 1, wherein said block copolymer is an A-B type or B-A type block copolymer.

3. The process for the preparation of a pressure-sensitive adhesive composition as claimed in claim 2, wherein said styrene-based polymer block A is present in an amount not exceeding 50% by weight based on the total weight of said block copolymer.

4. The process for the preparation of a pressure-sensitive adhesive composition as claimed in claim 1, wherein said block copolymer is an A-B-A type block copolymer.

5. The process for the preparation of a pressure-sensitive adhesive composition as claimed in claim 4, wherein said styrene-based polymer block A is present in an amount not exceeding 60% by weight based on the total weight of said block copolymer.

6. The process for the preparation of a pressure-sensitive adhesive composition as claimed in claim 1, 2, 3, 4 or 5, wherein said block copolymer contains a hydroxyl group in its polymer chain and is heat-crosslinked with addition of a polyfunctional isocyanate to the hydroxyl group.

7. The process for the preparation of a pressure-sensitive adhesive composition as claimed in claim 1, 2, 3, 4 or 5, wherein said block copolymer contains an epoxy group in its polymer chain and is irradiated with ultraviolet rays with addition of an onium salt-based curing catalyst thereto to epoxy-crosslink.

8. The process for the preparation of a pressure-sensitive adhesive composition as claimed in claim 7, wherein said block copolymer contains at least two epoxy groups per molecule.

9. The process for the preparation of a pressure-sensitive adhesive composition as claimed in claim 8, wherein said epoxy groups are incorporated in said block copolymer at or in the vicinity of the end of the polymer chain thereof.

10. The process for the preparation of a pressure-sensitive adhesive composition as claimed in claim 7, wherein said block copolymer contains at least one epoxy group and at least one hydroxyl group per molecule.

11. The process for the preparation of a pressure-sensitive adhesive composition as claimed in claim 10, wherein said epoxy groups are incorporated in said block copolymer at or in the vicinity of the end of the polymer chain thereof and said hydroxyl groups are incorporated in said block copolymer at or in the vicinity of the polymer chain thereof.

12. The process for the preparation of a pressure-sensitive adhesive composition as claimed in claim 7, wherein said block copolymer contains at least two hydroxyl groups per molecule and is epoxy-crosslinked with addition of the onium salt-based curing catalyst and an epoxy-based crosslinking agent to the hydroxyl group.

13. The process for the preparation of a pressure-sensitive adhesive composition as claimed in claim 12, wherein said hydroxyl groups are incorporated in said block copolymer at or in the vicinity of the end of the polymer chain thereof.

14. The process for the preparation of a pressure-sensitive adhesive composition as claimed in claim 1, wherein said transition metal is Cu, Ru, Fe, Rh, V or Ni and its ligand is a bipyridine derivative, mercaptan derivative or trifluorate derivative.

15. The process for the preparation of a pressure-sensitive adhesive composition as claimed in claim 14, wherein a combination of said transition metal and said ligand is $Cu^{+1}$-bipyridine complex.

16. The process for the preparation of a pressure-sensitive adhesive composition as claimed in claim 1, wherein said polymerization initiator is an ester- or styrene-based derivative containing a halogen in α-position.

17. The process for the preparation of a pressure-sensitive adhesive composition as claimed in claim 1, wherein said polymerization initiator contains an epoxy group or hydroxyl group in its molecule.

18. A process for the preparation of pressure-sensitive adhesive sheets comprising preparing a pressure-sensitive adhesive composition by subjecting a styrene-based monomer and an acrylic monomer represented by the general formula (1A): $CH_2=C(R^1)COOR^2$ wherein $R^1$ represents a hydrogen atom or methyl group, and R2 represents a $C_{2-14}$ alkyl group, to a living radical polymerization in an appropriate order of monomers using a polymerization initiator in the presence of a transition metal and its ligand to produce a block copolymer comprising at least two of a styrene-based polymer block A and an acrylic polymer block B bonded to each other, and then subjecting said block copolymer to crosslinking to produce a crosslinked polymer, wherein said styrene-based monomer and said acrylic monomer are subjected to a living radical polymerization together with at least one monomer selected from the group consisting of a monomer having an epoxy group in its molecule and a monomer having a hydroxyl group in its molecule, and providing a layer of the pressure-sensitive adhesive composition on a support.

* * * * *